US011958638B1

(12) United States Patent
Ratcliff et al.

(10) Patent No.: US 11,958,638 B1
(45) Date of Patent: Apr. 16, 2024

(54) SPACECRAFT SOLAR ARRAY BIASING AND TENSIONING SYSTEM

(71) Applicant: Space Exploration Technologies Corp., Hawthorne, CA (US)

(72) Inventors: Whitcomb T. Ratcliff, Redmond, WA (US); Joseph Fitzgerald, Woodinville, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 528 days.

(21) Appl. No.: 16/874,257

(22) Filed: May 14, 2020

(51) Int. Cl.
*B64G 1/44* (2006.01)
*B64G 1/22* (2006.01)

(52) U.S. Cl.
CPC .............. *B64G 1/443* (2013.01); *B64G 1/22* (2013.01); *B64G 1/222* (2013.01); *B64G 1/44* (2013.01)

(58) Field of Classification Search
CPC . B64G 1/22; B64G 1/222; B64G 1/44; B64G 1/443; H02S 30/10; H02S 30/20
See application file for complete search history.

(56) References Cited

U.S. PATENT DOCUMENTS

| 3,460,992 | A | * | 8/1969 | Aralov | H02S 30/20 |
| | | | | | 244/172.6 |
| 4,615,637 | A | * | 10/1986 | Pelischek | F16C 11/04 |
| | | | | | 16/370 |
| 5,487,791 | A | * | 1/1996 | Everman | B64G 1/222 |
| | | | | | 244/172.6 |
| 5,961,738 | A | | 10/1999 | Benton et al. | |
| 6,311,930 | B1 | * | 11/2001 | Hersh | B64G 1/222 |
| | | | | | 294/82.26 |
| 6,423,895 | B1 | * | 7/2002 | Murphy | H02S 30/20 |
| | | | | | 136/245 |
| 8,387,921 | B2 | | 3/2013 | Taylor et al. | |
| 9,550,584 | B1 | * | 1/2017 | Harvey | B64G 1/222 |
| 2018/0162561 | A1 | | 6/2018 | Estevez et al. | |

(Continued)

FOREIGN PATENT DOCUMENTS

| CN | 106915479 | A | * | 7/2017 | |
| CN | 113291494 | A | * | 8/2021 | |
| EP | 1688350 | A2 | * | 8/2006 | ............ B64G 1/222 |

(Continued)

OTHER PUBLICATIONS

Jeremy Banik, Structural Scaling Metrics For Tensioned-Blanket Space Systems, PHD thesis, The University of New Mexico, Albuquerque, New Mexico, USA, May 2014, 199 pages.

(Continued)

*Primary Examiner* — Richard Green
*Assistant Examiner* — Michael A. Fabula
(74) *Attorney, Agent, or Firm* — Polsinelli PC

(57) ABSTRACT

A solar array system associated with a spacecraft includes a solar array blanket portion moveable from a stowed configuration into a deployed configuration, an extendable frame coupled to the spacecraft and the blanket portion and moveable from at least a collapsed configuration into an extended configuration to move the solar array blanket portion from the stowed configuration into the deployed configuration, and at least one biasing member extending across an exterior portion of a first hinge assembly that is configured to bias at least a portion of the extendable frame into the deployed configuration.

15 Claims, 20 Drawing Sheets

(56) References Cited

U.S. PATENT DOCUMENTS

2018/0170586 A1    6/2018  Riskas
2019/0393830 A1 * 12/2019  Reid, Jr. ................. F15B 15/14

FOREIGN PATENT DOCUMENTS

KR       20090081139 A  * 10/2009  ............... B64G 1/10
KR       20100020228 A  * 10/2010  ............... B64G 1/10
WO       WO-9907017 A1  *  2/1999  ............... B64G 1/44

OTHER PUBLICATIONS

Straubel et al., Evaluation of Different Architectural Concepts For Huge Deployable Solar Arrays For Electric Propelled Space Crafts, Sep. 2016, 36 pages.

* cited by examiner

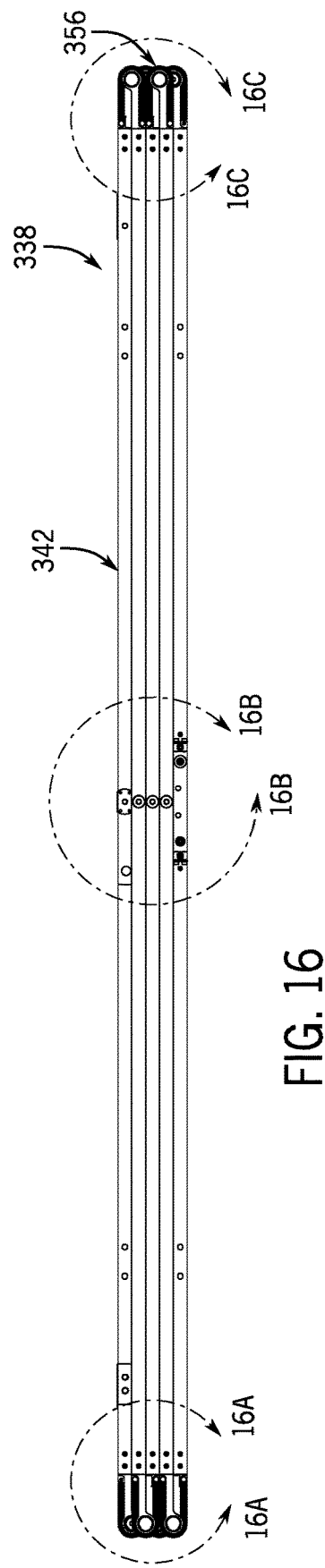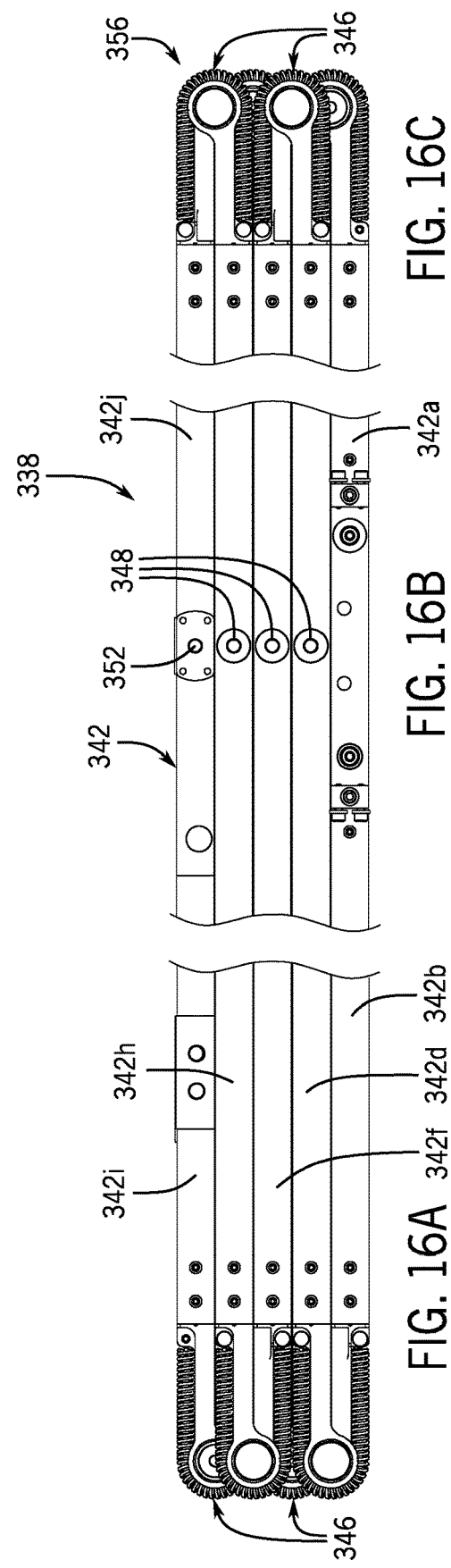

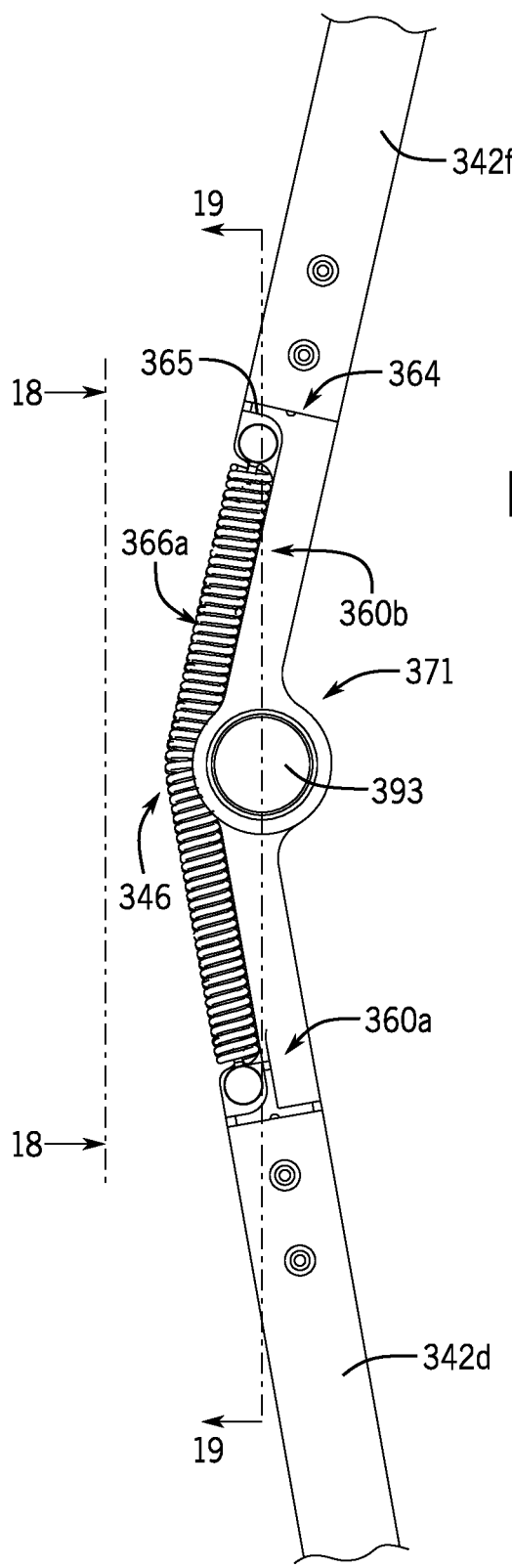
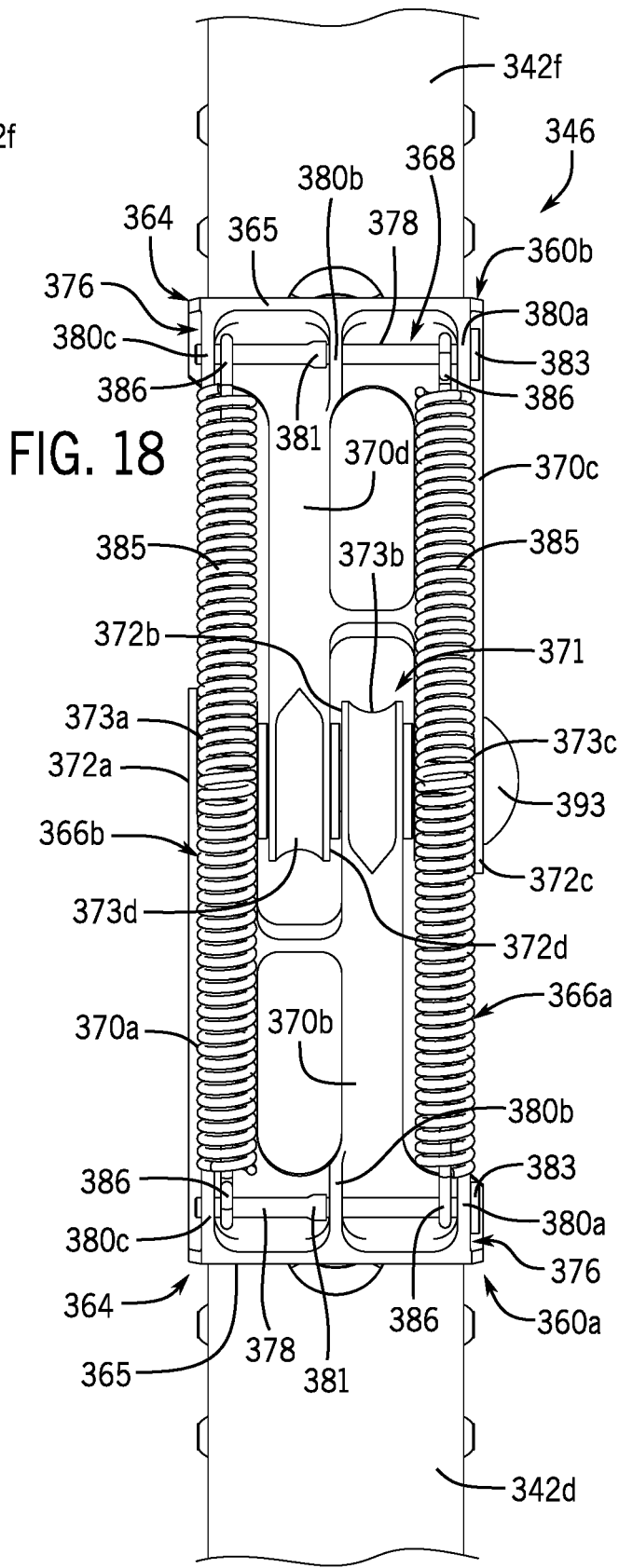
FIG. 17
FIG. 18

SPACECRAFT SOLAR ARRAY BIASING AND TENSIONING SYSTEM

BACKGROUND

Deployable solar arrays are typically contained in a small envelope when their space vehicle is launched. The solar arrays are later deployed to an extended configuration to expose areas of solar collectors to the sun's rays.

Spacecraft are limited in power, stowed volume, and mass available to meet requirements. These parameters are traded against each other as well as overall cost in spacecraft design. More efficient solar array packaging and mass allows spacecraft to have more power on orbit or the same power for less mass and stowed volume. Because of the extremely constrained nature of spacecraft design and because nearly all spacecraft require solar arrays for power, solar arrays with greater mass and volume efficiency could be used to increase the capability or decrease the cost of a spacecraft for any mission.

Solar arrays used on spacecraft typically employ one of two structural support types: accordion-folded rigid panels and tensioned flexible blankets. The standard array type in use today is the rigid panel type. Through a series of accordion folded composite plates of thicknesses typically ranging 0.25 to 1 inches, rigid panel arrays rely on bending stiffness through structural depth for stiffness and strength. Each panel is populated with electrically connected photovoltaic cells. Rigid panel arrays have a heritage of deployment reliability, and they package into launch vehicle fairings reasonably well for most missions. But the stacked-plate packaged form factor and poor mass efficiency does not scale well to the larger array sizes needed to satisfy future government and private industry spacecraft power needs.

Tensioned flexible blanket type of solar arrays, which are thin-film arrays packaged in a long roll or a pleated stack that is deployed using a separate boom or booms, are less common. However, tension flexible blanket solar arrays show strong promise of scalability toward high power levels due to exceptional packaging efficiency and good mass efficiency.

But the structural effects of scaling these tensioned arrays are currently not well understood by the spacecraft community. Most historically flown rectangular flexible blanket arrays have used a single compression column to react the tension and enforce deployment of either one or two flexible blankets. The downside of this traditional approach is the high cost of the deployable truss and the awkward stowage situation of a cylindrical boom canister joined orthogonally to a rectangular blanket box.

Embodiments of the present disclosure are directed to improving reliability, maximizing power output, minimizing complexity, and minimizing cost, as well as improving other features, in spacecraft solar arrays.

SUMMARY

A solar array system associated with a spacecraft includes a solar array blanket portion moveable from a stowed configuration into a deployed configuration, an extendable frame coupled to the spacecraft and the blanket portion and moveable from at least a collapsed configuration into an extended configuration to move the solar array blanket portion from the stowed configuration into the deployed configuration, and at least one biasing member extending across an exterior portion of a first hinge assembly that is configured to bias at least a portion of the extendable frame into the deployed configuration.

A system for deploying a solar array blanket portion relative to a spacecraft and supporting the solar array blanket portion in a deployed position includes an extendable frame moveable between a collapsed configuration and an extended configuration. The extendable frame includes a first support arm having first and second opposing distal ends, a second support arm having first and second opposing distal ends, a third support arm having first and second opposing distal ends, a fourth support arm having first and second opposing distal ends, a first pivot pin assembly defined at an intersection of the first and third support arms and a second pivot pin assembly defined at an intersection of the second and fourth support arms, a first hinge assembly defined between the second distal end of the first support arm and the first distal end of the second support arm, and a second hinge assembly defined between the second distal end of the third support arm and the first distal end of the fourth support arm. A first biasing member extends between the second and first distal ends of the first and second support arms along an exterior portion of the first hinge assembly.

A method of deploying a solar array associated with a spacecraft includes pulling a biasing member into tension across a hinge of an extendable frame as the extendable frame is moved into a collapsed configuration, securing the extendable frame in the collapsed configuration, and releasing the extendable frame into a deployed configuration.

A method of launching and releasing spacecraft from a rocket includes orienting a solar array of a first spacecraft against a chassis in a stowed configuration, arranging a second spacecraft adjacent to the first spacecraft to define a stacked spacecraft configuration in the rocket, launching the rocket, deploying the first and second spacecraft from the rocket into space, biasing the solar array from the stowed configuration into a deployed configuration along a deploy axis that is substantially perpendicular to a plane of the chassis, and steering the solar array about a steering axis that is substantially perpendicular to the deploy axis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosure will become more readily appreciated by reference to the following detailed description, when taken in conjunction with the accompanying drawings, wherein:

FIG. 16 depicts a front view of the stowed extendable frame of FIG. 14 isolated from the chassis;

FIG. 16A depicts an enlarged area of the stowed extendable frame of FIG. 16, identified by arrows 16A-16A;

FIG. 16B depicts an enlarged area of the stowed extendable frame of FIG. 16, identified by arrows 16B-16B;

FIG. 16C depicts an enlarged area of the stowed extendable frame of FIG. 16, identified by arrows 16C-16C;

FIG. 17 depicts a side view of a portion of an extendable frame deploy system in accordance with embodiments of the present disclosure;

FIG. 18 depicts a front view of the portion of the extendable frame deploy system of FIG. 17;

DETAILED DESCRIPTION

Figure 1:
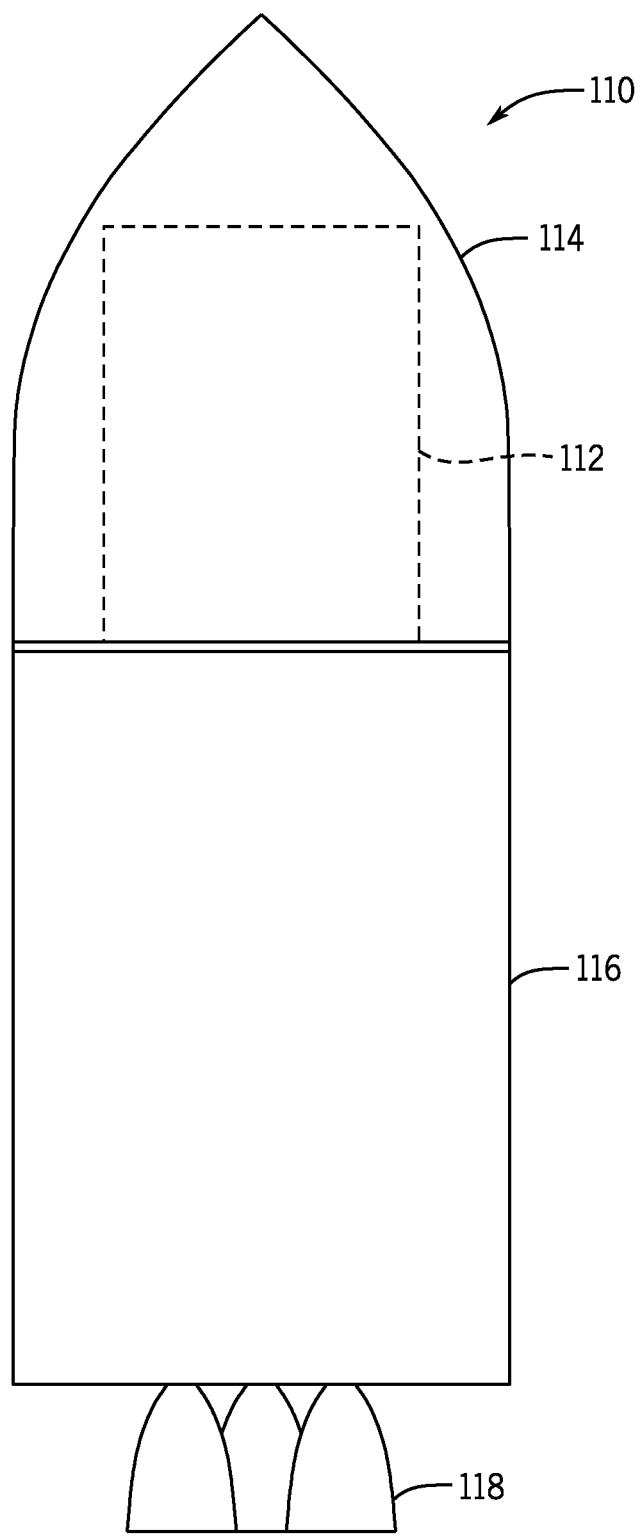
FIG. 1 depicts a simplified diagram of a rocket and a spacecraft system disposed within a rocket according to one embodiment of the present disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", "lateral", "Earth-facing", and "outer-space-facing", etc., in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Embodiments of systems and methods described and illustrated herein relate to a solar array associated with a spacecraft. The embodiments described herein relate to a solar array that is deployed from an on-orbit spacecraft in zero gravity. Those skilled in the art will recognize that the embodiments of the invention may be applied to other applications.

Embodiments of the systems and methods described herein relate to a solar array system and methods of deploying the solar array system from a stowed or collapsed configuration to an extended configuration. In some embodiments, the solar array system includes an extendable frame coupled to the spacecraft and moveable between at least a collapsed configuration and an extended configuration, a solar array blanket portion moveable from a collapsed configuration into an extended configuration when the extendable frame is moved from the collapsed configuration into the extended configuration, and an extendable frame deploy system configured to bias the extendable frame into the extended configuration. These and other aspects of the present disclosure will be more fully described below.

It should be appreciated that the terms "stowed", "collapsed", "folded", "launch", "first", "non-extended", etc., may be used interchangeably without departing from the scope of the present disclosure, and the terms "deployed", "extended", "unfolded", "expanded", "second", etc., may be used interchangeably without departing from the scope of the present disclosure. Similarly, terms such as "position", "configuration", "arrangement", "state", etc., may be used interchangeably without departing from the scope of the present disclosure. As such, such terms should not be seen as limiting.

Embodiments of the solar array system and methods of deploying the solar array system are also described and illustrated herein with regard to spacecraft systems including a single satellite or multiple satellites, which are launched either at the same time or in series (one at a time) from a single rocket. Multiple satellites may include satellites used for a satellite constellation. A plurality of satellites may include more than one layer of satellites in a satellite stack, more than two satellites, more than 10 satellites, more than 20 satellites, more than 50 satellites, etc.

Exemplary configurations and method of stacking of the satellites for launch and the release of satellites after launch will first be described.

Spacecraft System

FIG. 1 depicts a rocket 110 including an exemplary spacecraft system 112 secured inside a fairing 114 coupled to a launch vehicle 116. The launch vehicle 116 provides a rocket engine for propelling the rocket 110 during launch and/or flight. For example, the launch vehicle 116 can include one or more internal fuel chambers containing a rocket fuel (i.e., a propellant), combustion chambers, and/or rocket engine nozzles 118. The rocket fuel combusts in the combustion chamber to produce hot, high pressure gas, which the rocket engine nozzle 118 exhausts away from the launch vehicle 116. The rocket engine nozzle 118 can accelerate the gas received from the combustion chamber to facilitate converting thermal energy of the gas into kinetic energy of the launch vehicle 116. The launch vehicle 116 may include a single engine stage or a plurality of engine stages, which separate and ignite in sequence.

The fairing 114 is coupled to the launch vehicle 116 and encloses the spacecraft system 112 to protect the spacecraft system 112 from aerodynamic forces during flight through an atmosphere. The fairing 114 can then separate from the launch vehicle 116 after the aerodynamic forces drop below a certain value and/or the launch vehicle 116 reaches a particular location. By separating the fairing 114 from the launch vehicle 116, the spacecraft system 112 can be exposed to an external environment such as, for example, outer space. The spacecraft system 112 can then deploy into orbit a plurality of spacecraft such as, for example, satellites and/or interplanetary probes, as shown and described herein.

Spacecraft Stacking Assembly

Figure 2:
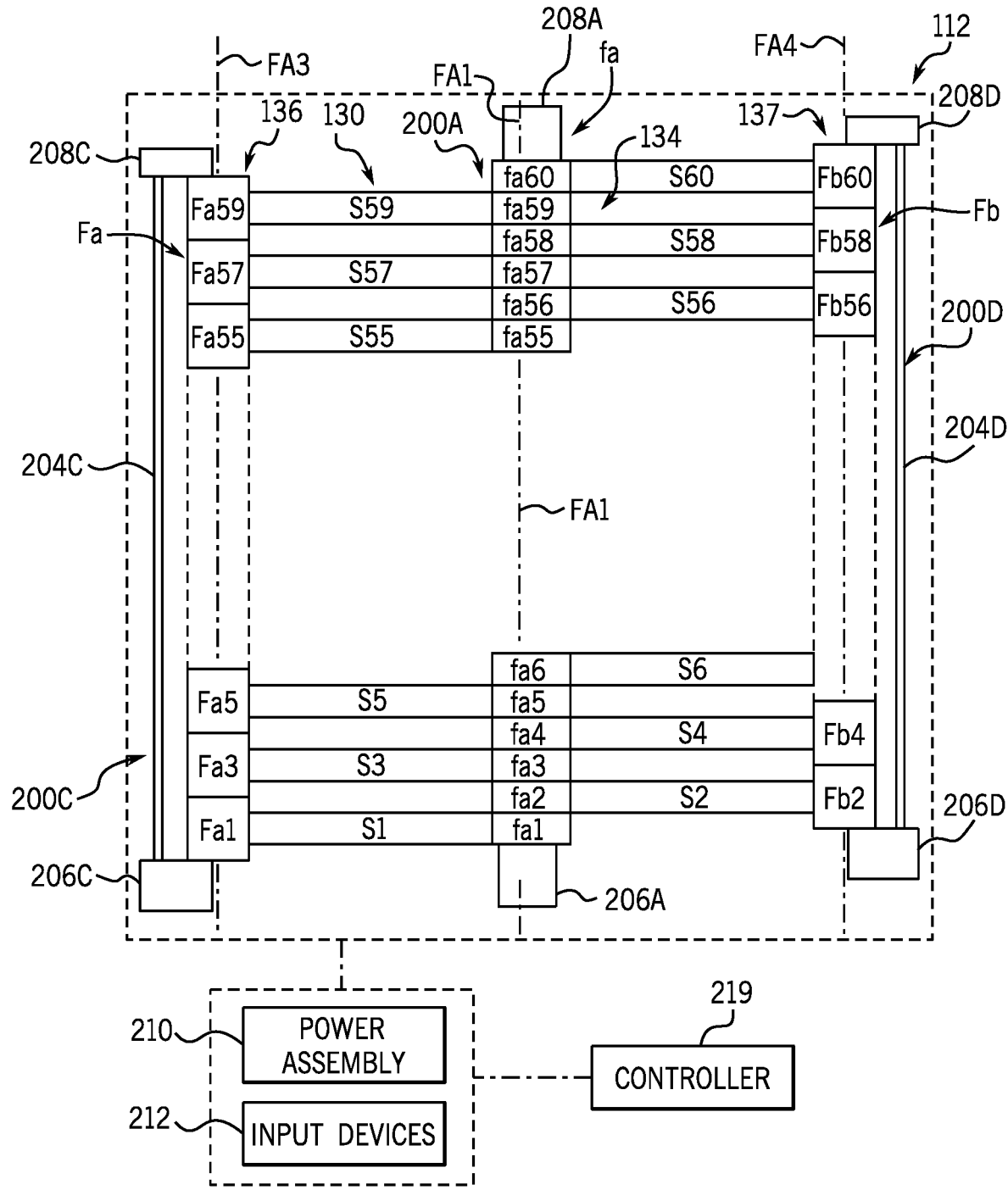
FIG. 2 depicts a simplified schematic diagram of the spacecraft system of FIG. 1.

FIG. 2 depicts a schematic of the spacecraft system 112 having plurality of satellites in a stacked configuration disposed within a payload fairing of a launch vehicle. The plurality of satellites include at least one bottom or aft satellite disposed vertically below at least one top or forward satellite, wherein the satellites bear the launch load, and a structure extending along the length of the stack releasably secures the satellites in the stacked configuration and releasably secures the stack to a payload adaptor (see adaptor 140) of the launch vehicle 116.

In the depicted example, a stack 130 includes sixty satellites S1-S60, with thirty satellites defining a first half of the stack, and with the remaining thirty satellites defining the second half of the stack in an overall substantially rectangular configuration. The first half of the stack includes satellites S1, S3, . . . , S55, S57, S59, stacked vertically on top of one another, and the second half of the stack includes satellites S2, S4, . . . , S56, S58, S60, stacked vertically on top of one another. The satellites are stacked such that the satellites in the second half of the stack are vertically offset from the satellites in the first half of the stack by the height of a single satellite. In other words, the stack 130 is arranged with vertically stacked satellites in a side by side stepped configuration. Each "layer" of the stack can be considered to include one satellite (a single step of the stack) or two satellites (two steps of the stack). It should be appreciated that the exemplary stack 130 depicted may instead have many other configurations, such as a different number or arrangement of satellites, a different type of spacecraft, etc., without departing from the scope of the claimed subject matter.

The satellites are releasably secured in a side-by-side, stepped stacked configuration through a suitable satellite separation fitting system. In general, the satellite separation fitting system is configured to releasably mate the layered satellites such that they passively release into orbit when released from the rocket while defining a primary load path(s) for the stack 130.

Figure 3:
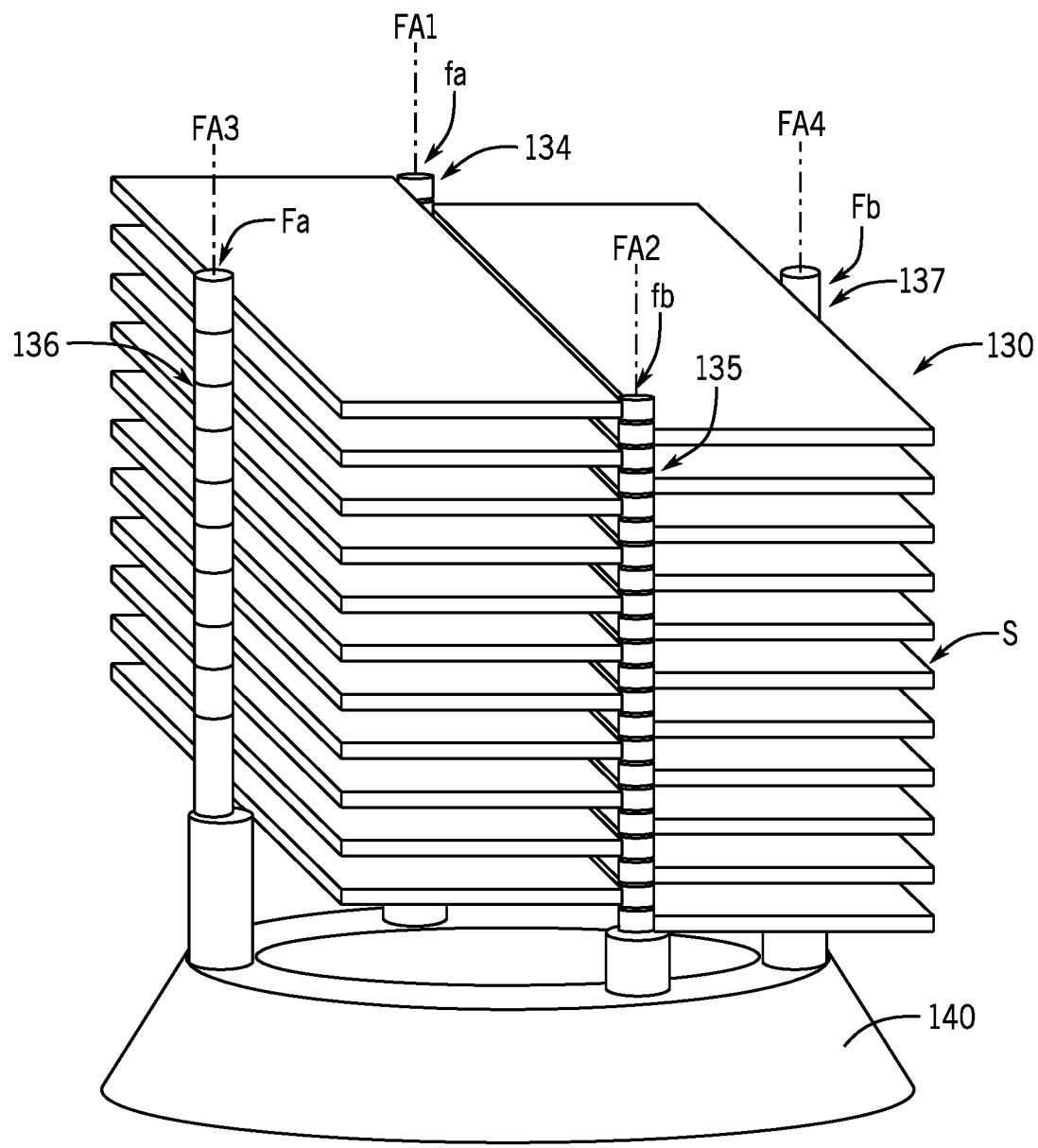
FIG. 3 depicts an isometric view of an exemplary spacecraft system according to the principles schematically represented in FIG. 2.

Referring additionally to FIG. 3, where less than 60 satellites S are shown for simplicity, the satellite separation fitting system may include first and second demi-separation fitting assemblies fa and fb configured to releasably mate satellites S1, S3, . . . S59 stacked in a first half of the stack 130 to stepped satellites S2, S4, . . . S60 stacked in a second half of the stack. In general the first and second demi-separation fitting assemblies fa and fb releasably mate the stepped satellites together at their stepped interface on opposite sides of the stack 130.

The first demi-separation fitting assembly fa is defined by a first stack of demi-separation fittings fa1-fa60 extending laterally from a first corner of the respective satellite S1-S60 toward the center of the stack 130. In particular, demi-separation fittings fa1, fa3, fa59 of corresponding satellites S1, S3, . . . , and S59 in a first half of the stack 130 are configured to releasably mate with the demi-separation fittings fa2, fa4, . . . fa60 of corresponding satellites S2, S4, . . . , and S60 in a second half of the stack 130. The demi-separation fittings fa1, fa2, fa3, fa4, . . . fa58, fa59, fa60 stack in an alternating fashion to define an aligned column of demi-separation fittings fa1-fa60. The stacked demi-separation fittings fa1-fa60 of the first demi-separation fitting assembly fa define a first load column 134 for the stack 130 having a first fitting axis FA1 along which load passes during launch of the rocket.

Similarly, the second demi-separation fitting assembly fb is defined by a second stack of demi-separation fittings fb1-fb60 extending laterally from a second corner of the respective satellites S1-S60 along the same elongated edge of the satellite S and toward the center of the stack 130. In particular, demi-separation fittings fb1, fb3, . . . fb59 of corresponding satellites S1, S3, . . . , and S59 in the first half of the stack 130 are configured to releasably mate with the demi-separation fittings fb2, fb4, . . . fb60 of corresponding satellites S2, S4, . . . , and S60 in the second half of the stack 130. The demi-separation fittings fb1, fb2, fb3, fb4, . . . fb58, fb59, fb60 stack in an alternating fashion to define an aligned column of demi-separation fittings fb1-fb60. The stacked demi-separation fittings fb1-fb60 of the second demi-separation fitting assembly fb define a second load column 135 for the stack 130 having a second fitting axis FA2 along which load passes during launch of the rocket. The second load column 135 would be in front of the first load column 134 in the schematic shown in FIG. 2.

The first and second demi-separation fitting assemblies fa and fb may be configured to support any suitable stacked, stepped satellite arrangement other than what is shown. Moreover, although first and second demi-separation fitting assemblies fa and fb are shown interposed between stepped satellites, fewer that one or more than two demi-separation fitting assemblies may instead be used.

In the depicted exemplary embodiment of FIG. 2, the satellite separation fitting system may further include first and second full height separation fitting assemblies Fa and Fb configured to releasably mate the satellites at third and fourth locations on opposite sides of the stack 130. In that regard, the separation fitting assemblies fa, fb, Fa, and Fb are defined at first, second, third, and fourth substantially equally spaced locations about the rectangular stack 130.

The first full height separation fitting assembly Fa is defined by a stack of full height separation fittings Fa1, Fa3, . . . Fa57, Fa59 extending from the elongated edge of the corresponding satellite S1, S3, . . . S57, S59 opposite the elongated edge from which the demi-height separation fitting assemblies fa1/fb1, fa3/fb3, . . . fa57/fb57, and fa59/fb59 extend. Similarly, the second full height separation fitting assembly Fb is defined by a stack of full height separation fittings Fb2, Fb4, . . . Fb58, Fb60 extending from the elongated edge of the corresponding satellite S2, S4, . . . S58, S60 opposite the elongated edge from which the demi-height separation fitting assemblies fa2/fb2, fa4/fb4, . . . fa58/fb58, and fa60/fb60 extend. It should be appreciated that the stack separation fitting system may instead include only one or more than two full height separation fitting assemblies on the same or different edge of the satellite S.

For each full height separation fitting assembly Fa and Fb, the full height separation fitting of a first, bottom satellite is sized and configured to releasably mate with the full height stack separation fitting of an adjacently positioned second, top (and possibly third, bottom) satellite. For instance, in the first half of the stack, the full height stack separation fitting Fa3 of satellite S3 is sized and configured to releasably mate with full height stack separation fitting Fa1 of satellite S1 and with the full height stack separation fitting Fa5 of satellite S5. Similarly, in the second half of the stack, the full height stack separation fitting Fb4 of satellite S4 is sized and configured to releasably mate with full height stack separation fitting Fb2 of satellite S2 and with the full height separation fitting Fa6 of satellite S6.

The stacked full height separation fittings Fa1, Fa3, . . . Fa57, Fa59 and Fb2, Fb4, . . . Fb58, Fb60 of the first and second full height separation fitting assemblies Fa and Fb define third and fourth load columns 136 and 137 on each side of the stack 130. The third and fourth load columns 136 and 137 define third and fourth fitting axes FA3 and FA4, respectively, along which load passes during launch of the rocket.

As noted above, the separation fitting assemblies fa, fb, Fa, and Fb are defined at first, second, third, and fourth substantially equally spaced locations about the rectangular stack 130. As such, the releasably mated stack separation fittings of the stacked satellites define first, second, third, and fourth equally spaced load columns 134, 135, 136, and 137 for the substantially rectangular stack 130. The evenly spaced arrangement of the load columns 134, 135, 136, and 137 substantially distributes the load evenly along the stack 130 during launch. In that regard, in addition to stacking the satellites such that they passively release into orbit when released from the rocket, the stacked satellites themselves define the primary structure of the stack 130, with the load columns 134, 135, 136, and 137 defining the load paths. The columns may also define a grounding path for the stack 130 to the rocket 110.

Figure 4:
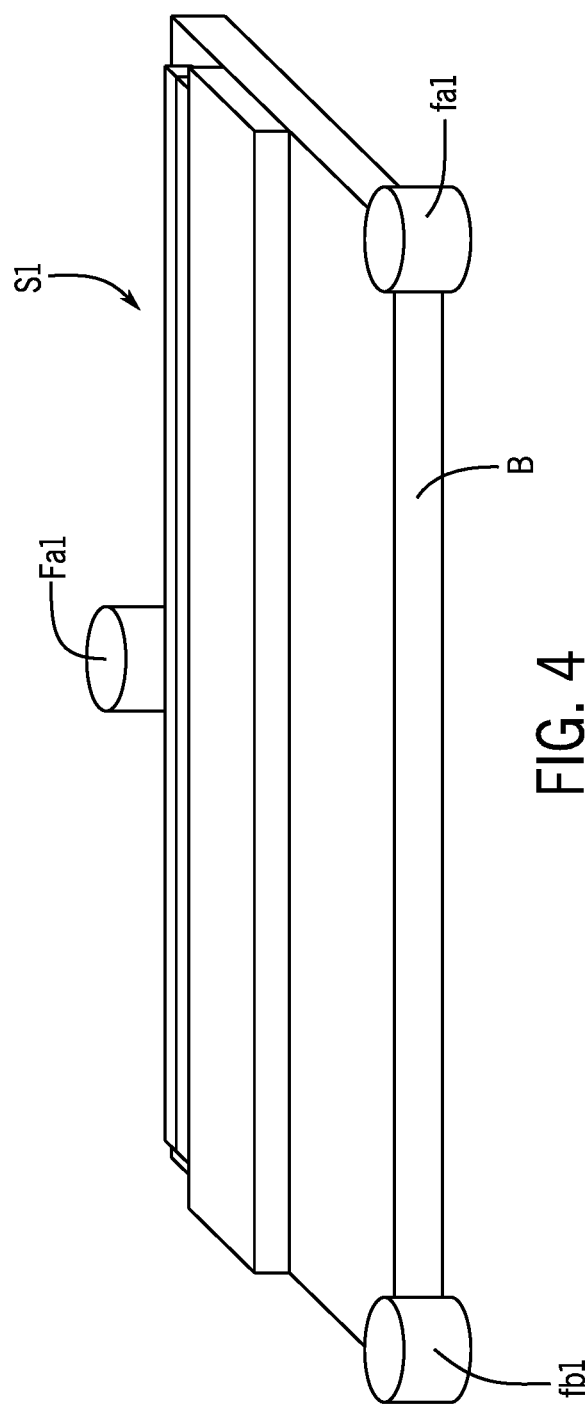
FIG. 4 depicts an isometric view of an exemplary embodiment of a spacecraft for use in the spacecraft system shown in FIG. 3.

Referring to FIGS. 3-5, 6A, and 6B, an exemplary embodiment of a separation fitting assembly configured to releasably mate the stepped satellites together such that they passively release into orbit and define a load column when stacked will now be described in more detail. FIG. 4 depicts a first satellite S1 having a substantially rectangular body B, with first and second demi-separation fittings fa1 and fb1 secured to opposite corners of one edge of the body B, and a full height separation fitting Fa1 secured to the body B in substantially the middle of the opposite edge (such as with bolts or other fasteners).

Each separation fitting is substantially identical, with the exception that the demi-separation fittings fa1 and fb1 are about half the height of the full height separation fitting Fa1 to accommodate the alternating stepped configuration of the stacked satellites, as described above and as further shown in FIG. 3. As such, only the first demi-separation fitting f1a will be described in detail.

Figure 5:
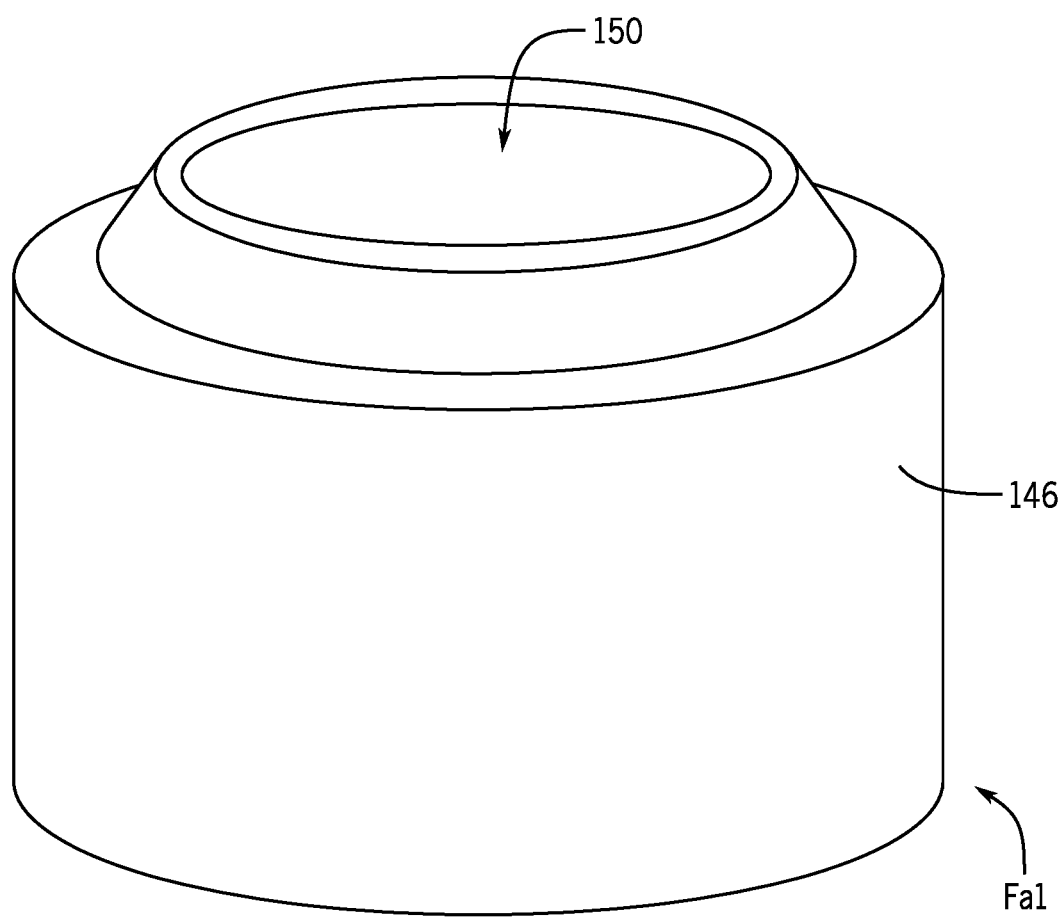
FIG. 5 depicts an isometric view of a separation fitting for use with the stacked configuration of spacecraft shown in FIG. 3.
Figure 6A:
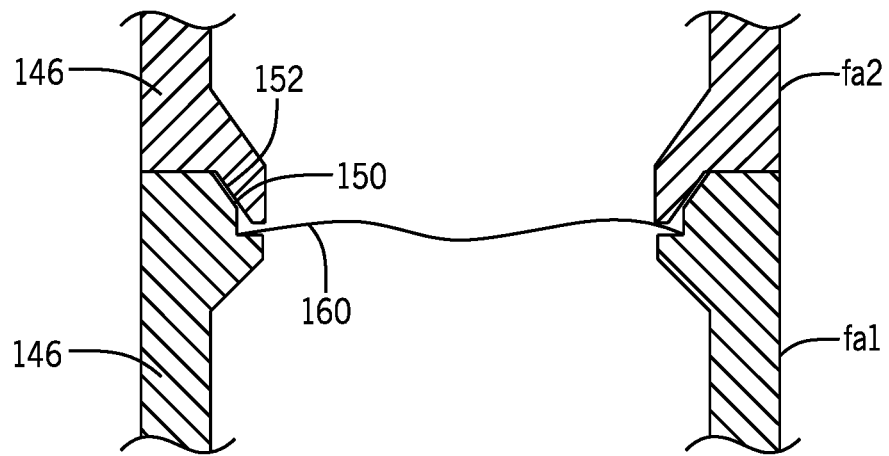
FIG. 6A depicts a cross-sectional view of stacked separation fittings for use with the stacked configuration of spacecraft shown in FIG. 3.
Figure 6B:
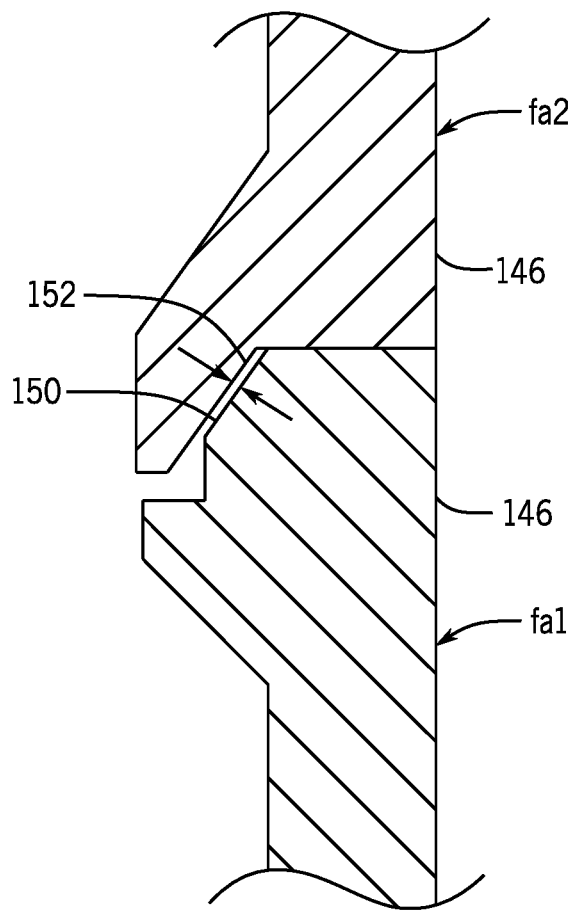
FIG. 6B depicts a zoomed-in view of the interface between the stacked separation fittings shown in FIG. 6A.
Figure 7:
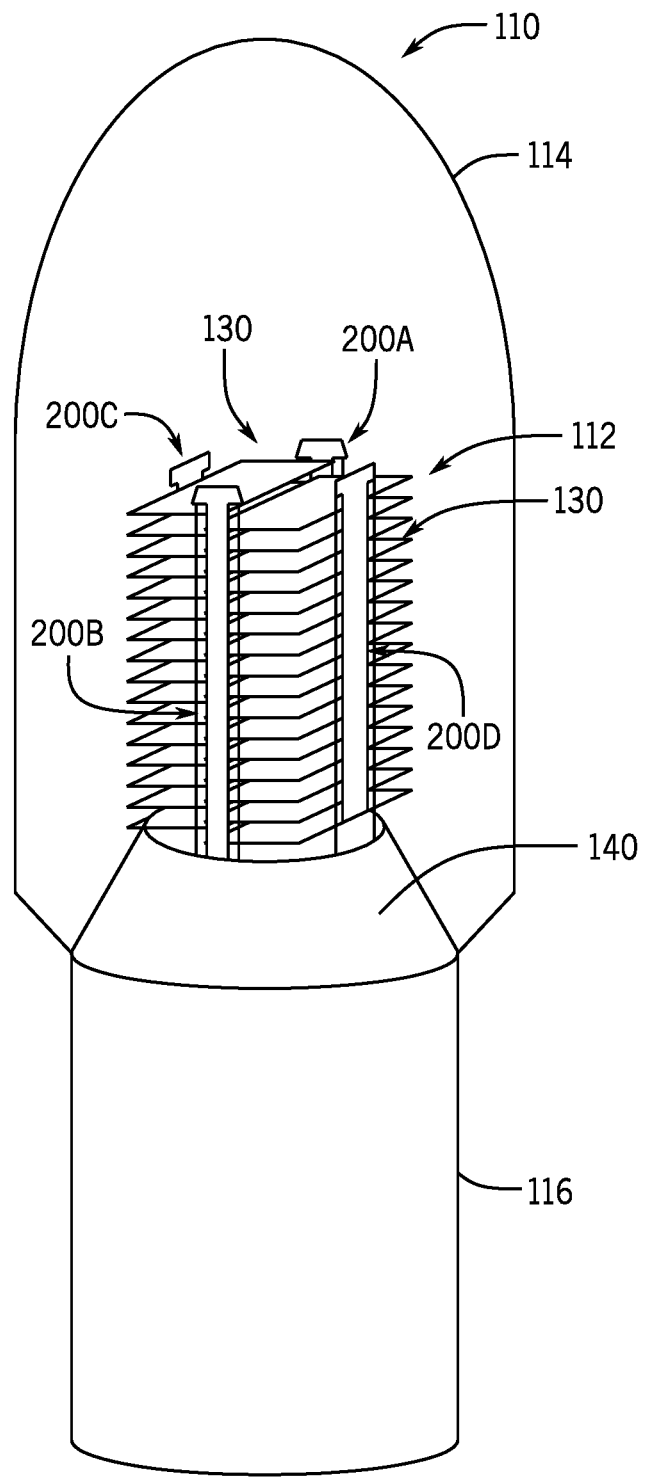
FIG. 7 depicts an isometric view of the exemplary spacecraft system shown in FIG. 3, wherein a hold-down and deploy system of the spacecraft system is shown in a first configuration and wherein the spacecraft system is shown disposed within a rocket.
Figure 8:
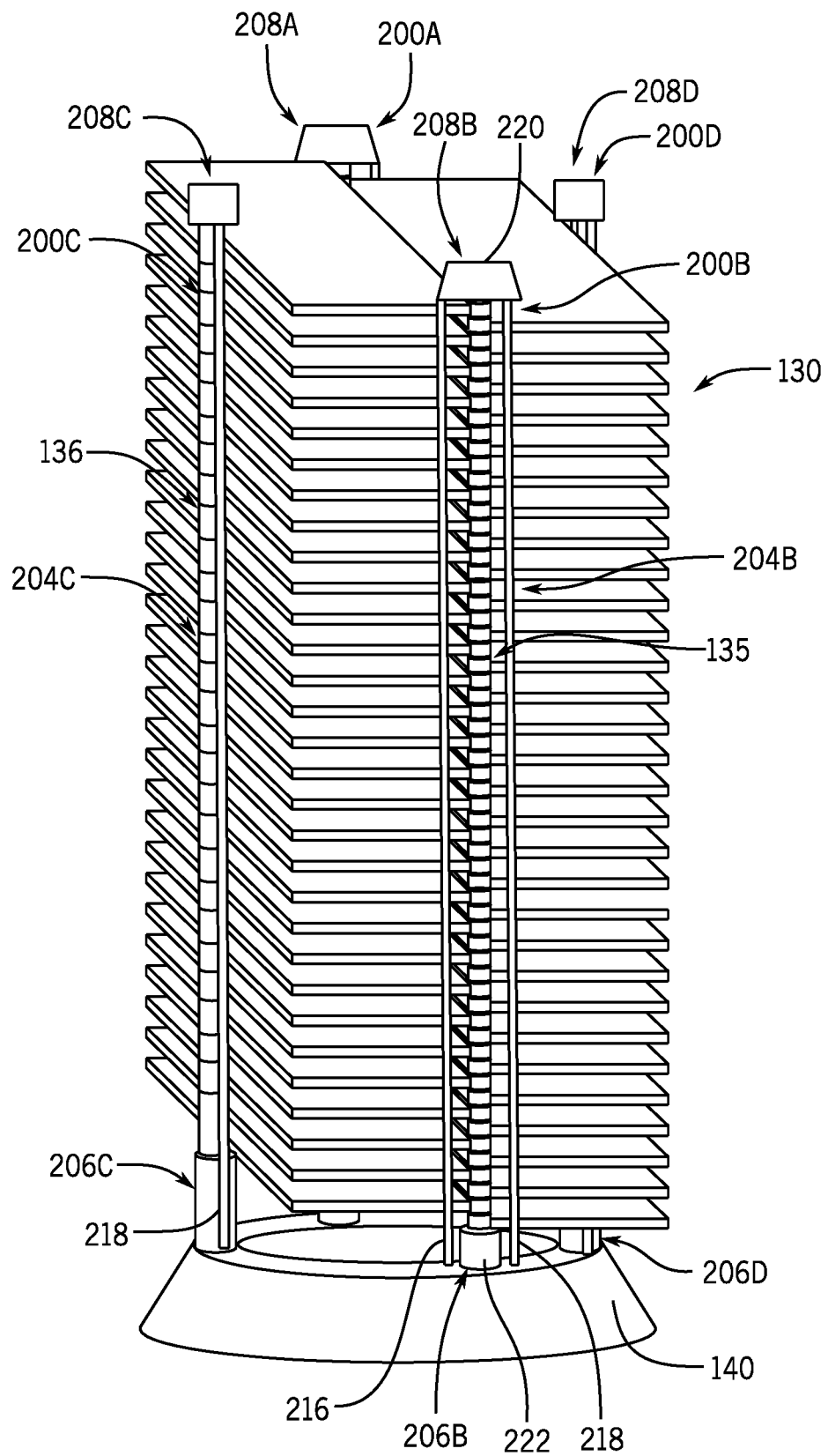
FIG. 8 depicts an isometric view of the exemplary spacecraft system shown in FIG. 7, wherein the hold-down and deploy system of the spacecraft system is shown in the first configuration.

Referring to FIGS. 5, 6A and 6B, the first separation fitting f1a includes a substantially cylindrical body 146 having a first interface 150 on a first (upper or forward) end, and a second interface 152 on a second (lower or aft) end. In the depicted embodiment, the first interface 150 is a cup shape, and the second interface 152 is a corresponding cone shape. In that regard, the cone-shaped second interface 152 of a top (or forward) satellite may be releasably received within or mated with the cup-shaped first interface 150 of a bottom (or aft) satellite, as shown in FIGS. 6A and 6B. The cup-cone interface of each separation fitting defines a joint between upper and lower satellites configured to withstand compressive loads, shear loads, and bending moment of the stack 130 during launch. In that regard, the separation fittings mate adjacent satellites such that no other significant portion of the satellite is required to withstand launch loads.

As can be seen in FIG. 6B, the cup-shaped first interface 150 has an inner diameter slightly larger than the outer diameter of the cone-shaped second interface 152 to prevent a taper lock between the interfaces. In other words, the cone-shaped second interface 152 is not press fit into the cup shaped first interface 150. Rather, the cone-shaped second interface 152 can be freely removed from the cup-shaped first interface 150 without any additional force. In that regard, the first and/or second interface 150/152 may be made with, treated with, or otherwise coated with a low-friction material to help ensure separation between the interfaces when the stack is released from the rocket. In one example, the first and/or second interface 150/152 is made from a hard-anodized material (such as aluminum) and/or coated with a dry film lubricant to define a low friction interface. In addition, a biasing device 160, such as a wave spring, may be disposed between the first and second interfaces 150 and 152 to help facilitate separation.

Spacecraft Hold-Down and Deploy Systems

Figure 10:
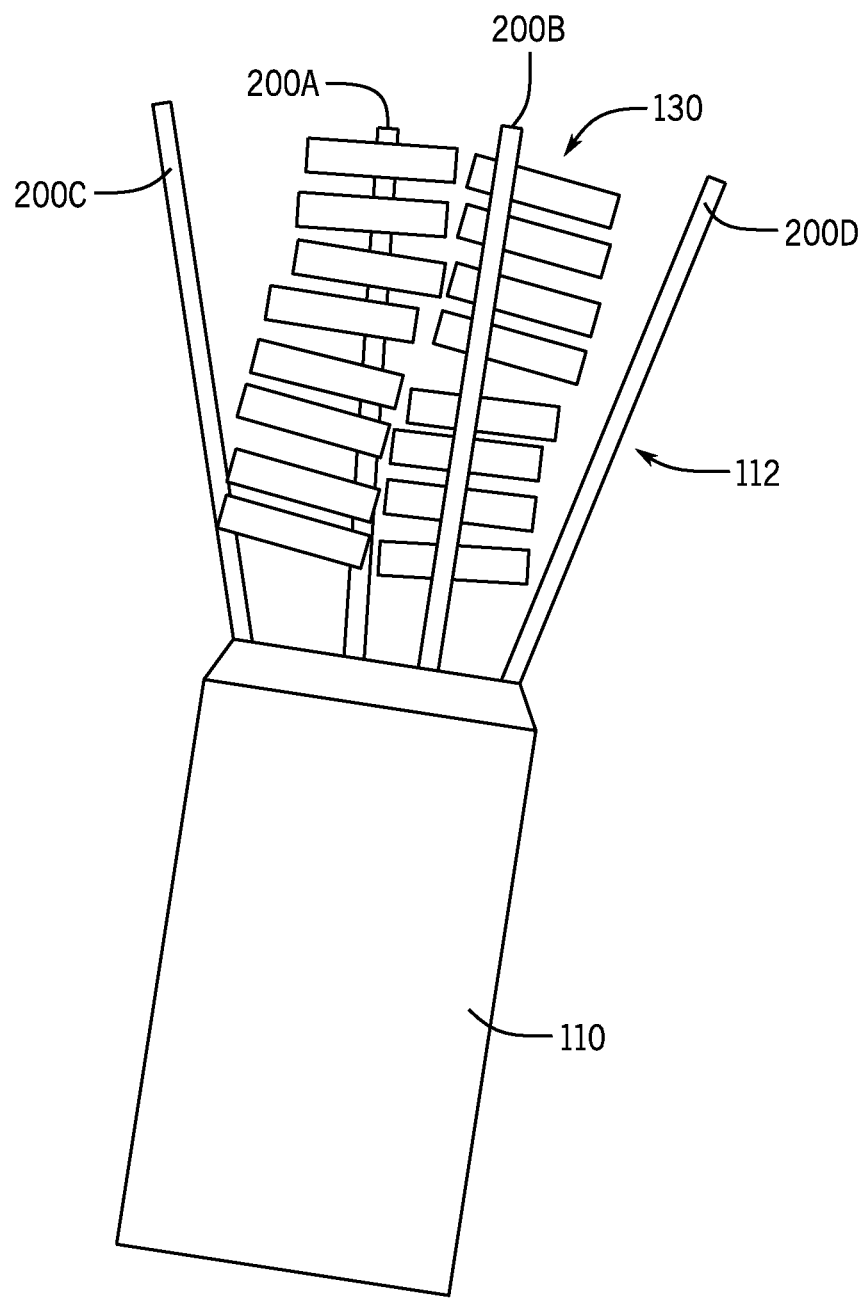
FIG. 10 depicts a simplified diagram showing the release of a spacecraft system including a plurality of satellites from a rocket.

As noted above with reference to FIG. 2, a structure extends along the length of the stack 130 to releasably secure the satellites S together and to releasably secure the stack 130 to a payload adaptor 140 of the launch vehicle 116. Upon reaching orbit, the structure coupled to the stack 130 is released from the stack so that each of the satellites S in the stack is passively dispensed from the payload adaptor 140 of the launch vehicle 116 without the use of a dedicated dispensing system (see FIG. 10). In other words, with the stack 130 arranged as a plurality of spacecraft S in layers, and with each spacecraft S releasably mated with at least one spacecraft S in an adjacent layer, the external structure is configured to, in a first configuration, secure the layers of the stack 130 together and secure the entire stack 130 to the launch vehicle 116, and, in a second configuration, release the entire stack 130 from the launch vehicle 116 into orbit such that the layers passively separate without activation of additional dispensing mechanisms.

Figure 9:
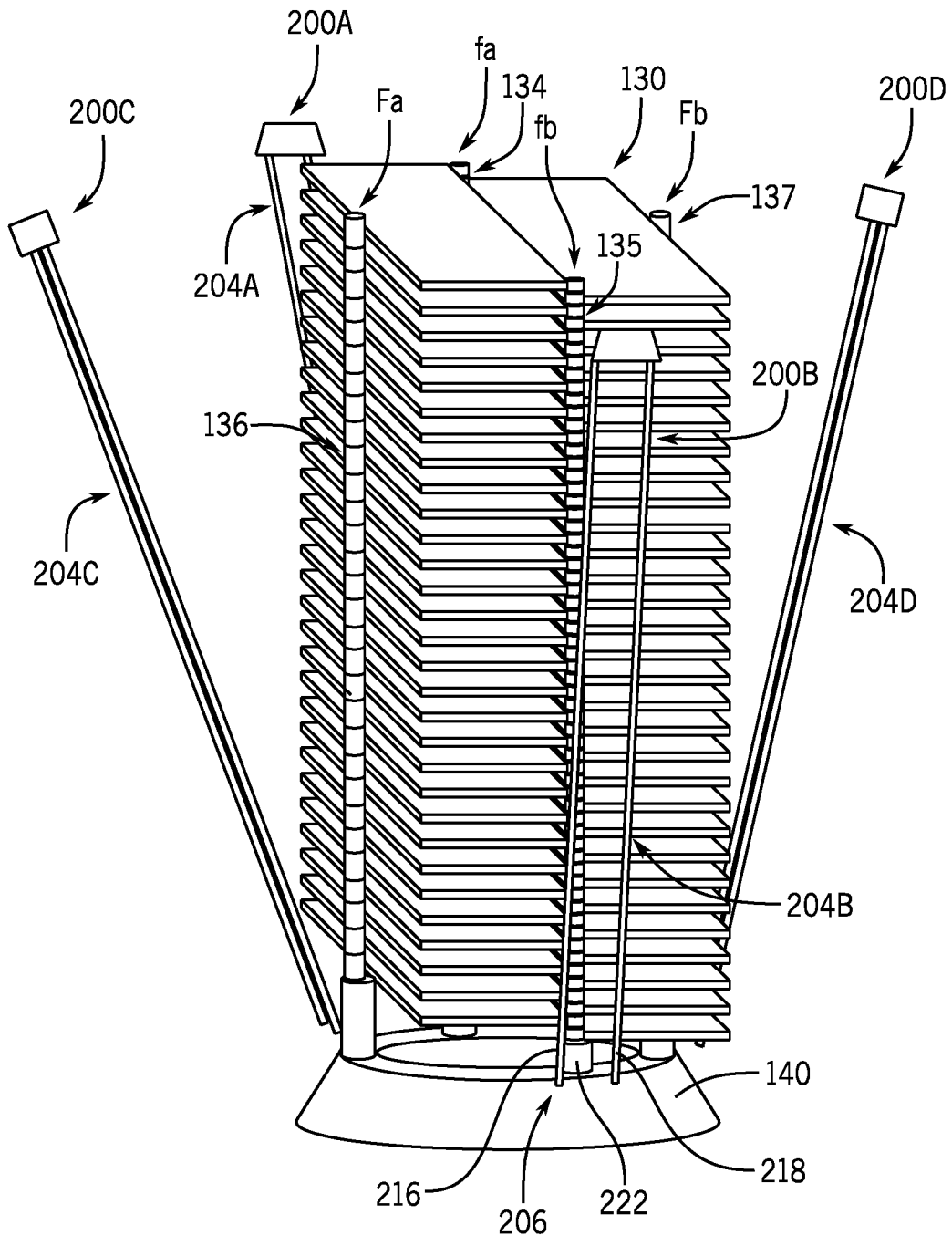
FIG. 9 depicts an isometric view of the exemplary spacecraft system shown in FIG. 3, wherein the hold-down and deploy system of the spacecraft system is shown in a second configuration.

Referring to FIGS. 2 and 7-10, in one embodiment, the structure is defined by first, second, third, and fourth hold-down and deploy systems 200A, 200B, 200C, and 200D extending externally along the length of the first, second, third, and fourth load columns 134, 135, 136, and 137. The first, second, third, and fourth hold-down and deploy systems 200A, 200B, 200C, and 200D are configured to apply a compressive load along the length of the corresponding first, second, third, and fourth load columns 134, 135, 136, and 137 in the first configuration (FIG. 8) and release the compressive load from the load columns in the second configuration (FIG. 9).

A general description of the first, second, third, and fourth hold-down and deploy systems 200A, 200B, 200C, and 200D will first be provided. The first, second, third, and fourth hold-down and deploy systems 200A, 200B, 200C, and 200D include first, second, third, and fourth tension rod assemblies 204A, 204B, 204C, and 204D, respectively, extending lengthwise between an aft tensioning and release mechanism 206A, 206B, 206C, and 206D and a forward tensioning and release mechanism 208A, 208B, 208C, and 208D, respectively. The first, second, third, and fourth hold-down and deploy systems 200A, 200B, 200C, and 200D are substantially identical; accordingly, the following description will generally describe a hold-down and deploy system 200 having a tension rod assembly 204 extending lengthwise between an aft tensioning and release mechanism 206 and a forward tensioning and release mechanism 208. Moreover, it should be appreciated that the fewer or more than four hold-down and deploy systems may instead be used.

In the first configuration (FIG. 8), the aft and forward tensioning and release mechanisms 206 and 208, in cooperation, stretch or otherwise create tension in the tension rod assembly 204, and in the second configuration, release the stretch/tension in the tension rod assembly 204. As a result, in the first configuration, the aft and forward tensioning and release mechanisms 206 and 208 cooperatively apply a compressive load to the corresponding load column (a "preload") 134, 135, 136, or 137. Moreover, in the second configuration (FIG. 9), the aft and forward tensioning and release mechanisms 206 and 208 cooperatively release all compressive loads from the load column and allow the stack to separate from the rocket.

The forward tensioning and release mechanism 208 includes a load head 220 that selectively engages the uppermost separation fitting in the respective load column such that it may apply a compressive load to the column when pulled down by the tension rod assembly 204. In one embodiment, the forward tensioning and release mechanism 208 is configured as a biased latching structure configured to latch the load head 220 to the top or forward end of the load column when a predetermined amount of load is imposed in the tension rod assembly 204, and configured to unlatch or otherwise disengage the load head 220 from the load column when a predetermined amount of load is released in the tension rod assembly 204.

The tension rod assembly 204 may include first and second rods 216 and 218 that extend along each side of the load column between the load head 220 of the forward tensioning and release mechanism 208 and a base 222 of the aft tensioning and release mechanism 206. In this manner, the tension rods 216 and 218 can pull down substantially equally on the load head 220 to help evenly distribute the compressive load along the load column. In that regard, a suitable balancing mechanism may be used to help distribute tension between the first and second rods 216 and 218.

The aft tensioning and release mechanism 206 allows the load head 220 to move into and out of engagement with the top of the load column and selectively impose tension in the rods 216 and 218 when the load head 220 is engaged with the top of the load column. In that regard, the aft tensioning and release mechanism 206 may be defined as a hinge structure configured to hingedly secure the aft end of the tension rod assembly 204 to the payload adaptor 140. In other words, the hold down and deploy system 200 can pivot about a hinge axis of the aft tensioning and release mechanism 206 to move between the first and second configurations.

In one embodiment, the aft tensioning and release mechanism 206 is also configured to releasably secure the rods 216 and 218 to the payload adaptor 140. In such an embodiment, the hold-down and deploy system 200 (and specifically, the forward tensioning and release mechanism 208, the rods 216/218, and at least a portion of the aft tensioning and release mechanism 206) separates from the payload adaptor 140 when pivoting away from the stack 130 (i.e., around the same time the satellites separate from the payload adaptor 140).

As noted above, the aft tensioning and release mechanism 206 is also configured to selectively apply tension in the rods 216 and 218. Any suitable configuration may be used to pull down on the rods 216 and 218 or otherwise stretch the rods 216 and 218 between the aft and forward tensioning and release mechanisms 206 and 208. In one embodiment, the aft tensioning and release mechanism 206 includes an actuator assembly configured to pull the rods 216 and 218 downwardly away from the forward tensioning and release mechanism 208 (to apply tension) and configured to allow the rods 216 and 218 to move upwardly toward the forward tensioning and release mechanism 208 (to release tension).

In operation, when the load is released in the rods 216 and 218, the forward tensioning and release mechanism 208 starts to unlatch from the top of the load column. Around the same time, the rods 216/218 start to hinge about a pivot axis of the aft tensioning and release mechanism 206 away from the stack 130. The rods 216 and 218 continue to pivot away from the stack 130 until the load head 220 disengages from the top of the load column and separates from the stack 130 (see FIG. 9). With the load head 220 disengaged from the top of the load column, the compressive load is released, and the satellites are free to separate from each other and from the payload adaptor 140 (see FIG. 10).

Components of the aft and forward tensioning and release mechanisms 206 and 208 are configured to be moved by a suitable power assembly 210 for applying and releasing tension in the rods 216 and 218. The power assembly 210 may include any suitable components for transmitting energy, such as one or more pneumatic, hydraulic, mechanical, and/or electromechanical actuators configured to power moveable mechanical parts. For instance, in one embodiment, the power assembly 210 may be configured as a pneumatic or hydraulic system configured to move a piston between at least first and second positions along the length of the tension rod assembly 204 to apply or release tension in the rods 216 and 218. In that regard, the power assembly 210 may include one or more valves (such as solenoid vales)

configured to selectively place an inlet and/or outlet line of the pneumatic or hydraulic system into fluid communication with a chamber of the piston for moving the piston.

The power assembly 210 may be activated by a suitable wired or wireless controller 219. For example, the controller 219 may include suitable circuitry for selectively opening one or more valves (such as solenoid vales) for fluidly connecting an inlet and/or outlet line (of a pneumatic or hydraulic assembly) with a chamber of the piston for moving the piston. In some embodiments, the controller 219 may include suitable circuitry for activating and controlling the speed, direction, etc., of a motor to control the movement of the piston or other moveable structure.

In some embodiments, the controller 219 may also be in wired or wireless communication with one or more input devices 212 of the hold-down and deploy system 200, such as sensors, switches, etc. For instance, the tension rods 216 and 218 may include strain gauges for measuring the tension in the rods during ground operations before launch and/or during launch. In addition, and as noted above, the separation fittings may include pressure sensors or switches that are activated when adjacent satellites separate. The input devices 212 may include suitable circuitry to send one or more output signals indicative of a measurement, status, etc., and the controller 219 may include suitable circuitry for processing the one or more output signals.

The controller 219 may be any suitable electronic client device, such as a computer, personal digital assistant, cell phone, tablet computer, or any other suitable device on a network in which computer software or other digital content may be executed. The electronic client device can be controlled either directly or by a remote connection using industry standard communication protocols such as HART, Modbus, 4-20 mA, and H1, as well as other protocols.

Spacecraft

Referring to FIGS. 11-14, an exemplary spacecraft 300 having a deployable solar array 314 formed in accordance with embodiments of the present disclosure will now be described. In general, the spacecraft 300 includes a chassis 302 designed and configured for carrying various components of the spacecraft 300.

The chassis 302 is defined by a chassis body 304 having any suitable shape and configuration for carrying the desired components during launch and in outer space. In the depicted exemplary embodiment, the chassis body 304 is generally an elongated, flattened solid plate or panel on which various components may be mounted or otherwise integrated. More particularly, the chassis body 304 has an overall substantially flattened rectangular shape defined by first and second opposing sides 308 and 310 bounded by first and second opposing generally elongated edges 311 and 313 and first and second opposing shortened edges 315 and 317. The first side 308 is an Earth-facing side, and the second side 310 is an outer-space-facing side, which carries the solar array 314 for harnessing solar energy from the sun.

Solar Array System

Figure 12:
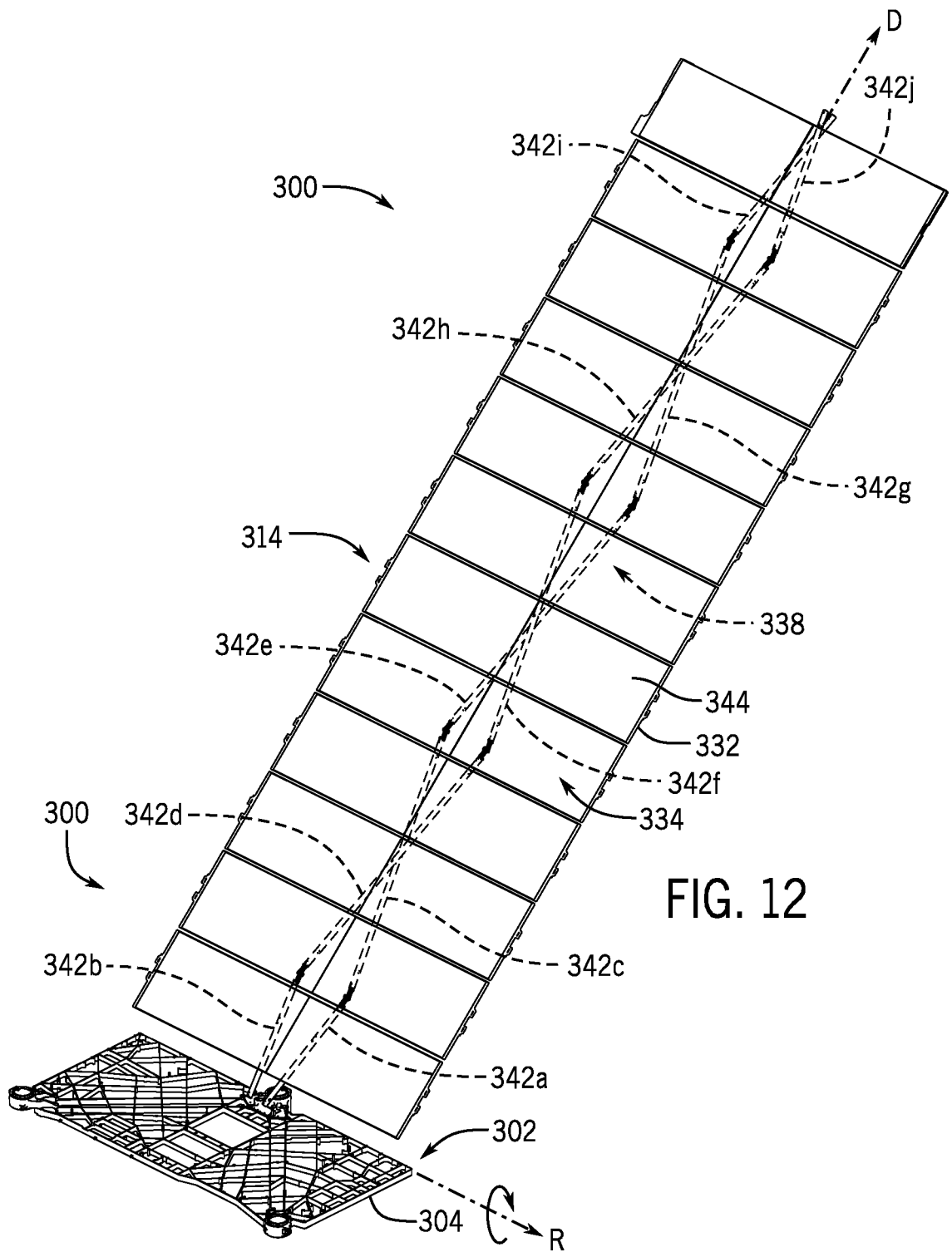
FIG. 12 depicts an isometric view of the spacecraft of FIG. 11 with the solar array shown in a second extended configuration.
Figure 13:
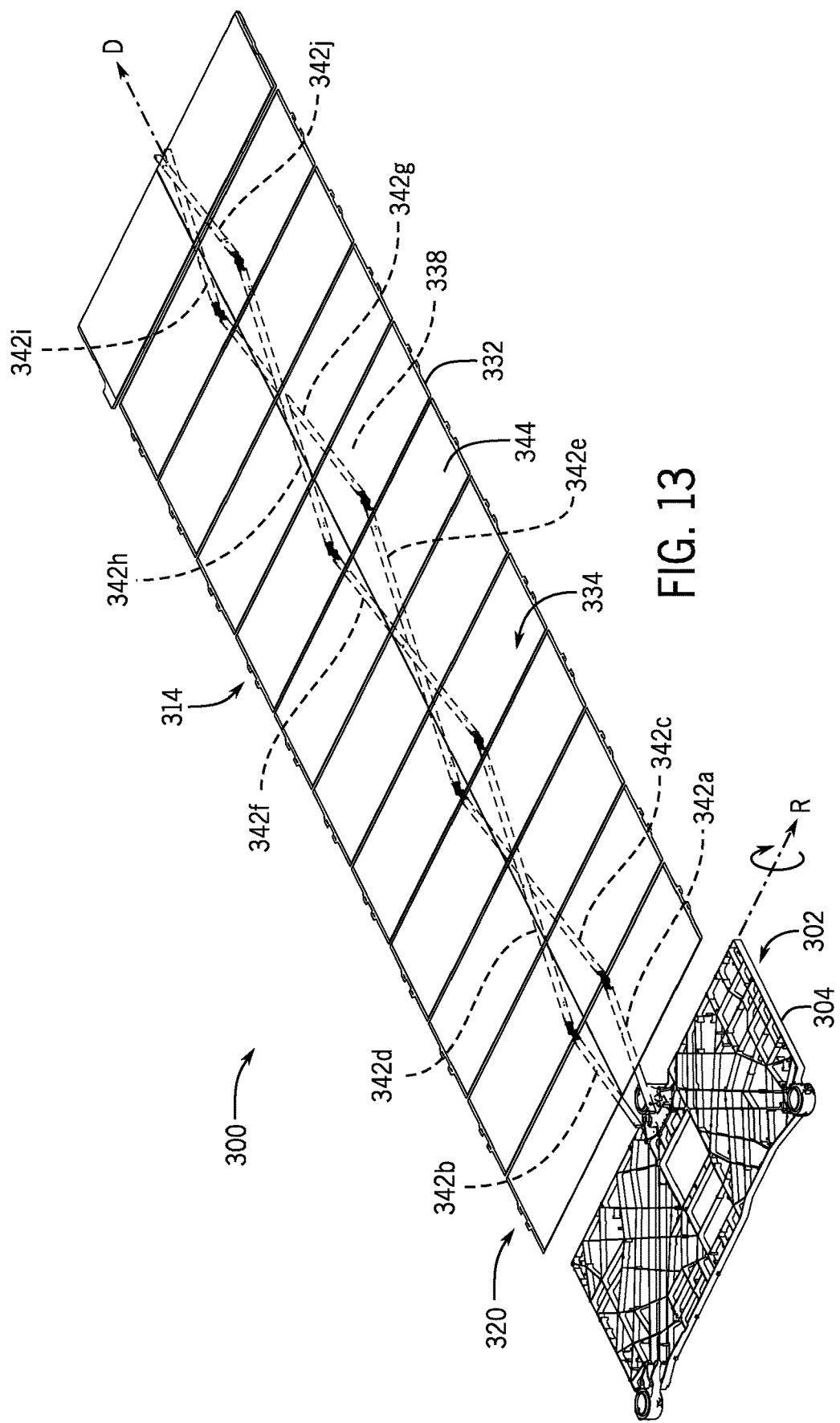
FIG. 13 depicts an isometric view of the spacecraft of FIG. 11 with the solar array shown in a third extended configuration.
Figure 14:
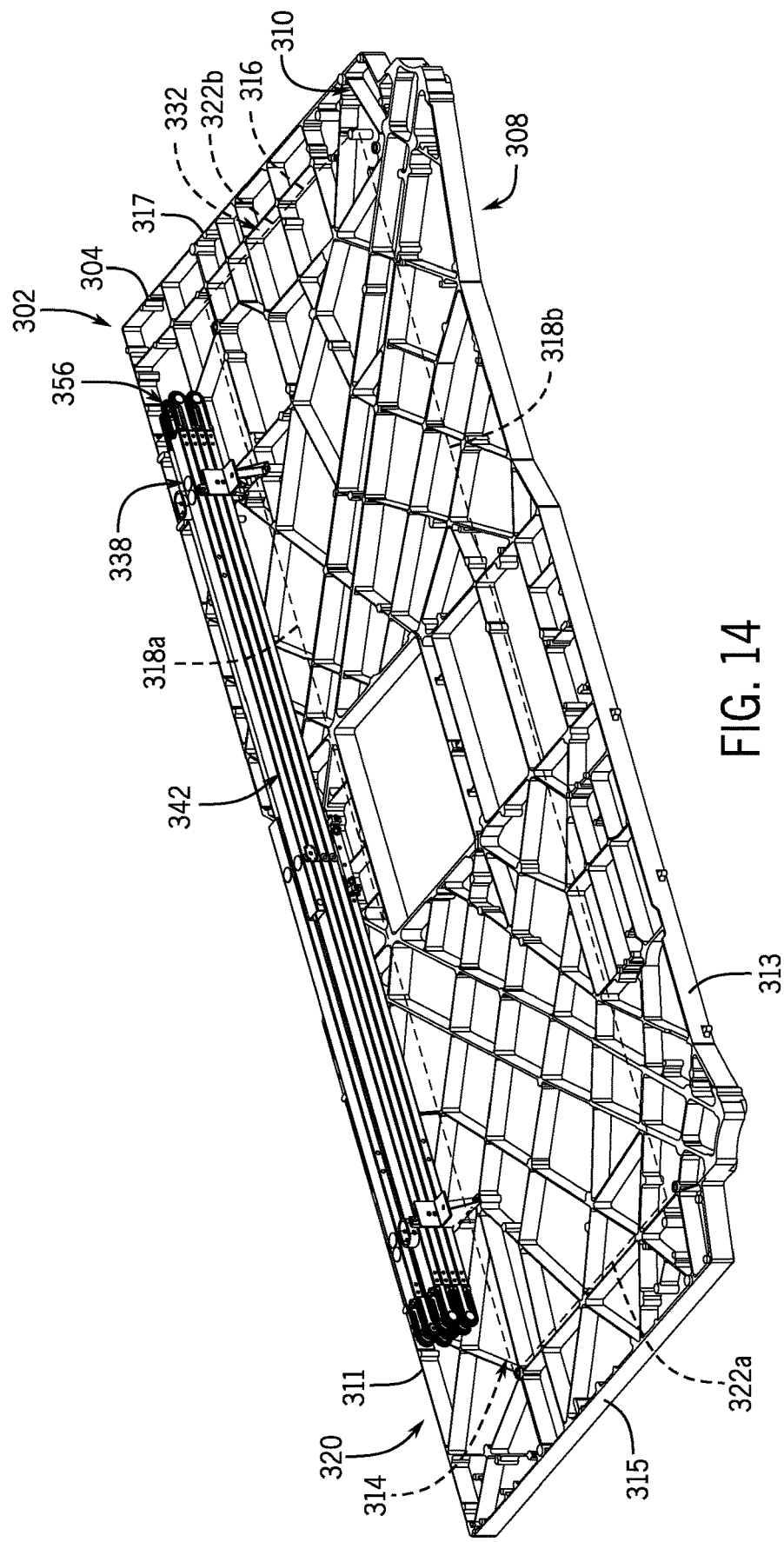
FIG. 14 depicts an isometric view of an outer-space-facing side of a spacecraft with an extendable frame of the solar array shown in a stowed configuration against a chassis in accordance with embodiments of the present disclosure.

Referring to FIGS. 11-21, this section describes a solar array system 320 of a spacecraft or satellite 300. As described herein, the solar array system 320 has a solar array 314 that is generally configured as a "boom and blanket." In that regard, the solar array 314 includes architecture that moves a flexible blanket portion 332 from a collapsed, non-deployed configuration, such as during launch of the rocket, as shown in FIG. 14 (shown without the blanket portion), to an extended, deployed configuration, shown in FIGS. 11-13. Moreover, once deployed, the architecture supports the blanket portion 332 in the extended configuration The basic components of the solar array 314 will first be described with reference to FIGS. 11-13. The solar array 314 is shown in its extended configuration, extending from the satellite chassis 302 and configured to provide solar power to the satellite 300. As noted above, the solar array 314 includes a flexible blanket portion 332 having a first side 334 configured to be oriented toward the sun in the extended position. Although not shown in detail, the blanket portion 332 is defined by a sheet of photovoltaic solar cells (e.g., thin-film solar cells) or solar modules 344 arranged on a thin substrate. When in the deployed configuration, the solar modules are arranged in a substantially planar, extended configuration. The solar modules may be secured together in any suitable manner to define an extended blanket portion 332 having a predetermined length. Moreover, a conductive harness (not shown) is attached to the blanket portion 332 to collect current from the solar panels and deliver the current to the satellite as a power source.

In the collapsed or non-deployed configuration, as shown in hidden lines in FIG. 14, the flexible blanket portion 332 is collapsed or folded in an accordion-like fashion or a Z-fold and laid generally flat on the second side 310 of the chassis body 304 of the spacecraft 300. In this folded and substantially laid-flat configuration, the blanket portion 332 forms a rectangle with a perimeter 316 defined by first and second opposing long edges 318a and 318b, a pair of opposing short edges 322a and 322b, and four corners (not labeled). It should be appreciated that the terms "collapsed," "folded," "non-deployed," etc., should not be seen as limiting, as the solar array may instead be positioned on the chassis body 304 in any suitable launch configuration against or near the chassis body 304. Moreover, it should be appreciated that in some instances, the terms "solar array" and "blanket portion" may be used interchangeably.

As noted above, the solar array 314 includes architecture (i.e., the boom portion) that moves the flexible blanket portion 332 from a collapsed configuration to an extended configuration. In the embodiments described herein, the solar array system 320 includes a solar array deploy system (i.e., boom) configured to move the folded blanket portion 332 out into an extended, deployed configuration and secure the extended blanket portion 332 in the deployed configuration. In comparison to traditional, heavy-duty boom structures, the solar array deploy system 320 is preferably lightweight, compact, and low-cost.

Figure 11:
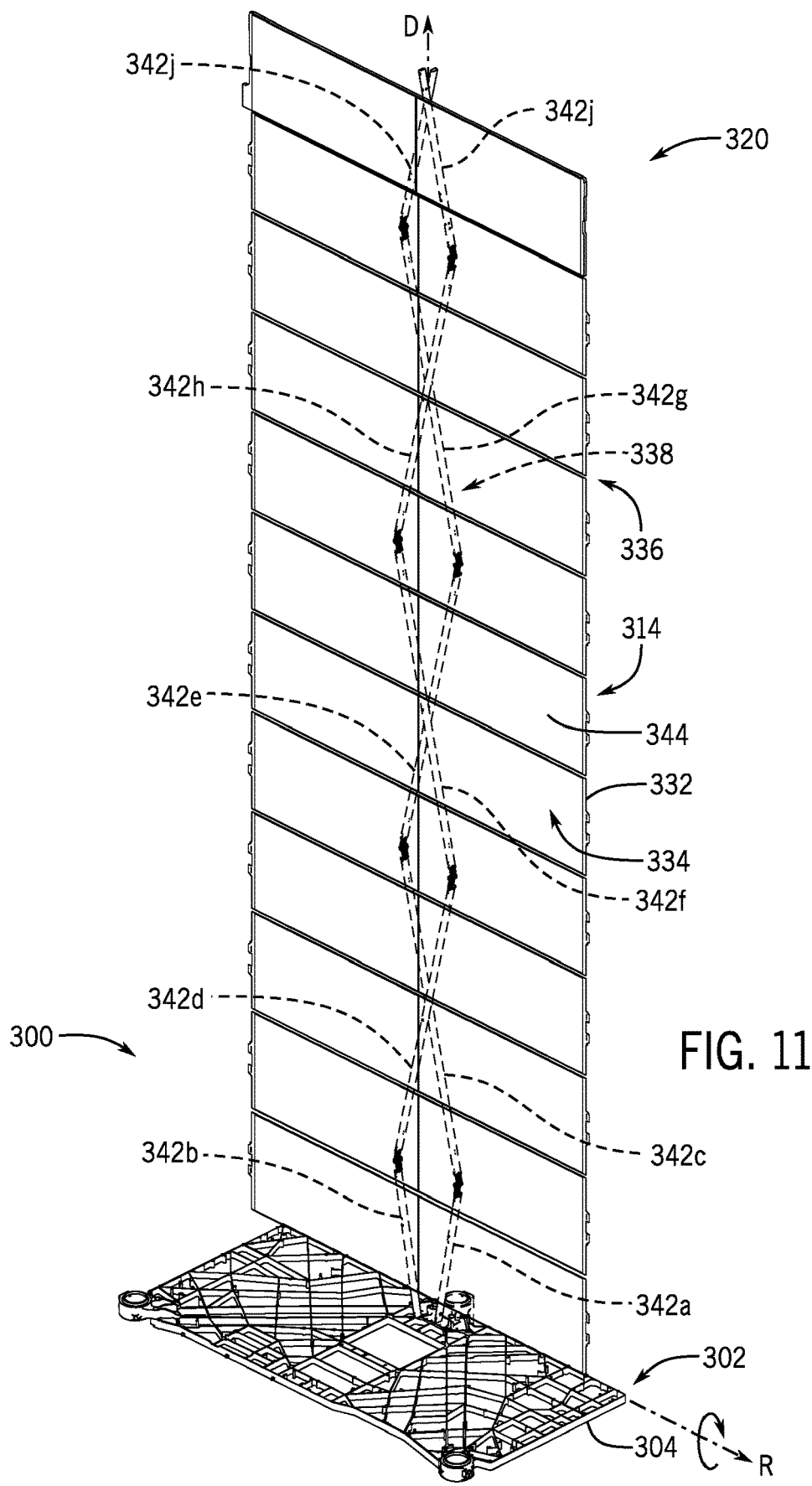
FIG. 11 depicts an isometric view of an outer-space-facing side of a spacecraft having a solar array system with a solar array shown in a first extended configuration in accordance with embodiments of the present disclosure.

In the exemplary embodiments, the solar array deploy system is configured as a biased extendable frame 338 moveable from a collapsed configuration against the chassis body 304, adjacent to the folded blanket portion 332 (see FIG. 14), into an extended configuration extending along the second or back side 336 of the blanket portion 332 and securing the deployed blanket portion 332 in tension (see FIGS. 11-13).

An exemplary embodiment of the extendable frame 338 will now be described in detail with reference to FIGS. 11-21. In one aspect, the extendable frame 338 is configured as a mechanical scissor mechanism or pantograph having a plurality of linked, folding support arms (generally referred to as "support arms 342") arranged in a crisscross "X" pattern. The extendable frame 338 is arranged with a suitable number of linked support arms 342 such that the extendable frame 338 suitably extends between the chassis body 304 and the distal end of the blanket portion 332 in the deployed configuration.

Referring specifically to FIGS. 11-13 and 15, the extendable frame 338 includes first and second proximal half support arms 342*a* and 342*b* each pivotally coupled to the chassis 302 at a proximal end, first and second distal half support arms 342*i* and 342*j* pivotally connected together at their distal ends to the distal end of the blanket portion 332, and intermediate intersecting support arms 342*c*-342*h* extending between the proximal and distal half support arms and hingedly coupled at their distal ends to the distal end of an upper or lower support arm. It should be appreciated that less or more support arms than that shown may instead be used.

A suitable first intersection pivot pin assembly 348 is used to pivotally connect the intermediate intersecting support arms 342*c*-342*h* at their intersection to define the "X" pattern. The first intersection pivot pin assembly 348 may be any suitable low-friction pivot assembly that allows the intersecting support arms to pivot relative to each other, such as a pivot pin passing through one or more bushings received transversely within the intersecting support arms 342. A similar second intersection pivot pin assembly 352 may pivotally connect the intersecting first and second distal half support arms 342*i* and 342*j*. The second intersection pivot pin assembly 352 may also be any suitable low-friction pivot assembly that allows the distal ends of the distal support arms 342*i* and 342*j* to pivot relative to each other, such as a pivot pin (not labeled) passing through one or more bushings received transversely within the distal half support arms 342*i* and 342*j*.

The support arms 342, when arranged in the crisscross pattern, define first and second halves of the extendable frame 338 extending in first and second vertically adjacent planes. More specifically, support arms 342*a*, 342*c*, 342*e*, 243*g*, and 342*i* form a first half of the extendable frame 338 that extend along a first vertical plane relative to the chassis 302, and support arms 342*b*, 342*d*, 342*f*, 243*h*, and 342*j* form a second half of the extendable frame 338 that extend along a second vertical plane relative to the chassis 302 adjacent to the first vertical plane. In that regard, the support arms 342 in the first and second halves of the extendable frame 338 are offset in adjacent vertical planes such that they may be pivotally coupled together and may move vertically relative to one another between the collapsed and extended configurations.

Hard stops, guides, or the like may be defined on portions of the extendable frame 338 to maintain the first and second halves of the extendable frame 338 in their vertical planes as the extendable frame 338 is moved from a collapsed configuration into an extended configuration. Any suitable hard stops, guides, etc., may be used. For instance, first and second opposing hard stops (not shown in detail) may be defined on opposite interior surfaces of the first and second distal half support arms 342*i* and 342*j* that interfere if one of the first and second distal half support arms 342*i* and 342*j* crosses over past the vertical plane dividing the first and second halves of the extendable frame 338. Any other or additional alignment structure may instead be used.

The support arms 342 may be any suitable length and configuration to provide the necessary extension, strength, and durability for deploying and supporting the deployed blanket portion 332, yet minimizing the weight and overall footprint of the spacecraft 300. For instance, the support arms 342 may each be of a generally rectangular, hollow tubular construction to maximize strength and minimize weight and mass. Any suitable material may be used, such as aluminum. Moreover, the extendable frame 338 is symmetrical about a vertical axis of the frame. In other words, the length of the first and second proximal half support arms 342*a* and 342*b* may be substantially equal, the length of the first and second distal half support arms 342*i* and 342*j* may be substantially equal, and the length of the intermediate intersecting support arms 342*c*-342*h* may be substantially equal.

In order to pop the folded blanket portion 332 out into an extended, deployed configuration, the extendable frame 338 includes an extendable frame deploy system 356 configured to generate a deployment force that biases the extendable frame 338 into the extended position. Further, the extendable frame deploy system continues to bias the extendable frame 338 towards the extended position after fully deployed. In this manner, the extendable frame 338 may extend from the chassis 302 to react tension in the blanket portion 332 during deployment of the solar array 314 and when in a deployed configuration. The extendable frame deploy system 356, in its simplicity, is also fast to assemble, lightweight, and low cost.

In one embodiment, the extendable frame deploy system 356 is generally a passive system configured to generate opening torque at hinged connections between the ends of the interconnecting support arms 342. In that regard, the extendable frame deploy system 356 may be configured as a plurality of biasing hinge assemblies 346 defined between the distal ends of interconnecting support arms 342. For instance, the intermediate intersecting support arms 342*c*-342*h* may be pivotally connected at their distal ends to one another or to the proximal and distal half support arms 342*a,b* and 342*i,j* through a biasing hinge assembly 346.

Figure 19:
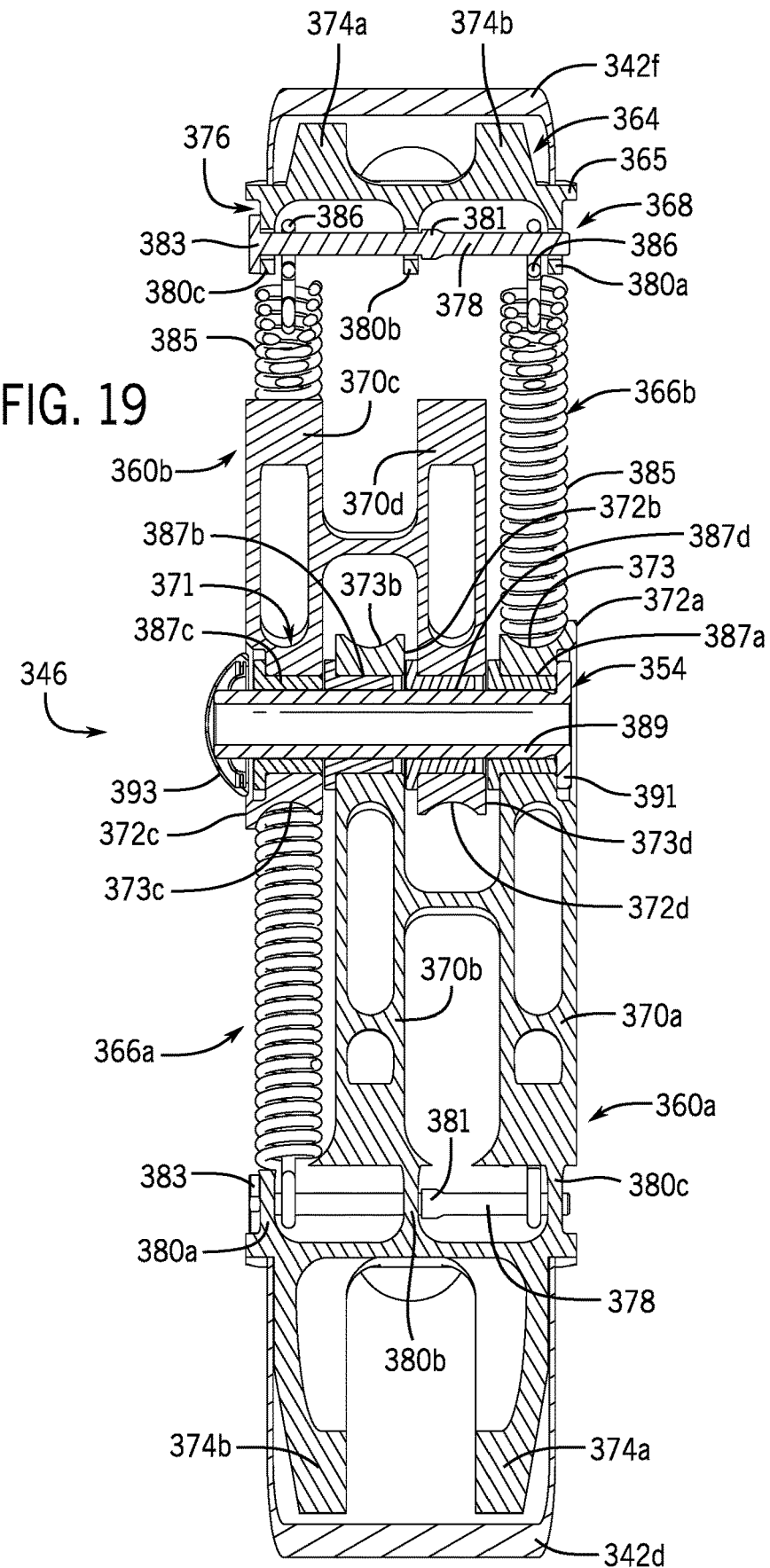
FIG. 19 depicts a cross-sectional view of the portion of the extendable frame deploy system of FIG. 17, taken substantially across line 19-19.

Referring specifically to FIGS. 16-19, an exemplary embodiment of a biasing hinge assembly 346 will now be described. For ease of description and illustration, FIGS. 17-19 show an enlarged, isolated view of a biasing hinge assembly 346 pivotally connecting the second and fourth intermediate intersecting support arms 342*d* and 342*f*. It should be appreciated that a substantially identical biasing hinge assembly 346 may be used to pivotally connect the ends of the other support arms.

In one aspect, the biasing hinge assembly 346 is configured to pivotally connect the second and first ends, respectively of the intermediate intersecting support arms 342*d* and 342*f* for allowing the arms to move from the collapsed, non-deployed position (FIGS. 14 and 16) into the extended, deployed configuration (FIGS. 11-13). In that regard, the hinge assembly 346 includes a hinge pivot pin 354 extending transversely through the second and first ends of the second and fourth intermediate intersecting support arms 342*d* and 342*f*.

The hinge pivot pin 354 may extend through one or more hinge pivot pin bushings 358 received within openings in first and second overlapping hinge brackets 360*a* and 360*b* secured to or otherwise defined on the second and first ends of the intermediate intersecting support arms 342*d* and 342*f*, respectively. More specifically, a first hinge bracket 360*a* extends from the second distal end of the second intermediate intersecting support arm 342*d*, and a second hinge bracket 360*b* extends from the first distal end of the fourth intermediate intersecting support arm 342*f*. The hinge brackets 360*a* and 360*b* are substantially identical; and therefore, only the second hinge bracket 360*b* will be described in detail.

As may best be seen by referring to FIGS. 17-19, the second hinge bracket 360*b* includes a base 364 having a shoulder portion 365 positionable against the first open distal end of the fourth intermediate intersecting support arm 342*f*. The shoulder portion 365 is of a generally rectangular shape to substantially match the cross-sectional shape of the fourth intermediate intersecting support arm 342f However, the shoulder portion 365 has a perimeter that is at least slightly larger than the perimeter of the first open distal end of the fourth intermediate intersecting support arm 342f In this manner, a bottom surface of the shoulder portion 365 abuts against the first open end of the fourth intermediate intersecting support arm 342f to prevent further inward movement of the hinge bracket 360b.

The second hinge bracket 360b is configured to be mounted to the first end of the fourth intermediate intersecting support arm 342f in any suitable manner. For instance, first and second mounting extensions 374a and 374b may extend transversely from the bottom surface of the shoulder portion 365 and may be received within an opening in the first distal end of the fourth intermediate intersecting support arm 342f The first and second mounting extensions 374a and 374b may include openings for receiving one or more fasteners (not labeled) passing transversely through opposing sidewalls of the fourth intermediate intersecting support arm 342f to fixedly secure the mounting extensions 374a and 374b within the distal open end of the support arm 342f A press-fit may also be defined between the first and second mounting extensions 374a and 374b and the first distal open end of the fourth intermediate intersecting support arm 342f for ease of assembly and insertion of the fasteners. It should also be appreciated that the support arm and the hinge bracket may instead be one integral assembly.

As can be appreciated, the biasing hinge assembly 346 defines a pivotal connection between the second and first ends, respectively of the intermediate intersecting support arms 342d and 342f for allowing the arms to move from the collapsed, non-deployed position (FIGS. 14 and 16) into the extended, deployed configuration (FIGS. 11-13). As noted above, the extendable frame deploy system 356 is also configured to generate a deployment force that biases the extendable frame 338 into the extended position. In that regard, the biasing hinge assembly 346 includes at least one biasing member extending along an exterior of the hinge assembly that is configured to urge the support arms 342, and therefore the extendable frame 338 into the extended, deployed configuration.

In the depicted embodiment, the at least one biasing member is defined by first and second extension springs 366a and 366b extending along the exterior surfaces of the overlapping first and second hinge brackets 360a and 360b. The ends of the first and second extension springs 366a and 366b may connect to a transverse retaining pin 368 secured within the base 364 of each of the hinge brackets 360a and 360b, respectively, to load tension into the biasing hinge assembly 346.

In that regard, the second hinge bracket 360b further includes a spring mounting portion 376 defined on an exterior surface of the base 364 opposite the first and second mounting extensions 374a and 374b. The spring mounting portion 376 is configured to secure the retaining pin 368 to an exterior surface of the base 364 such that it extends transversely across the width of the base 364. In the depicted embodiment, the spring mounting portion 376 includes first, second, and third pin-mounting protrusions 380a, 380b, and 380c defined on the exterior surface of the base 364 that include transverse openings configured to receive an elongated body 378 of the retaining pin 368 therein.

The first and third pin-mounting protrusions 380a and 380c are located near opposite lateral edges of the base 364, and the second pin-mounting protrusion 380b is located substantially centrally between the first and third pin-mounting protrusion 380a and 380c. In this manner, when the retaining pin 368 is received within the first, second, and third pin-mounting protrusions 380a, 380b, and 380c, the pulling force of the first and second extension springs 366a and 366b on the retaining pin 368 is substantially distributed across the length of the elongated body 378. It should be appreciated that any other number or arrangement of pin-mounting protrusions or the like may instead be used to secure the retaining pin 368 transversely within the base 364.

The retaining pin 368 is axially retained within the pin-mounting protrusions 380a, 380b, and 380c in any suitable manner. In the depicted embodiment, the retaining pin 368 includes a head 383 defined at a first end of an elongated body 378, and the head 383 engages the exterior transverse surface of the first pin-mounting protrusion 380a when the elongated body 378 is fully received within the first, second, and third pin-mounting protrusions 380a, 380b, and 380c. In that regard, the head 383 abuts the first pin-mounting protrusion 380a and prevents the elongated body 378 from moving in a first axial direction.

The retaining pin 368 also includes at least one annular protrusion 381 defined on its elongated body 378 that is engageable with the second pin-mounting protrusion 380b to prevent the elongated body 378 from moving in a second, opposite axial direction. The annular protrusion 381 is positioned to engage the second pin-mounting protrusion 380b after passing through the openings in the first and second pin-mounting protrusions 380a and 380b. In that regard, the annular protrusion 381 may be configured as a barbed annular protrusion or another suitable configuration for suitably passing through the first and second pin-mounting protrusions 380a and 380b when moved in the first axial direction and thereafter engaging the second pin-mounting protrusion 380b to prevent movement in the second, opposite axial direction. In that regard, the annular protrusion 381 may, in one embodiment be suitably elastic such that it may deform to pass through the openings in the pin-mounting protrusions 380a and 380b, but it returns toward its original shape after passing through the openings to catch on the second pin-mounting protrusion 380b. In the alternative, the pin-mounting protrusions 380a and 380b may be suitably elastic for allowing the annular protrusion 381 to pass therethrough.

With the head 383 engaging the first pin-mounting protrusion 380a and with the annular protrusion 381 passed through the second pin-mounting protrusion 380b, the retaining pin 368 extends substantially across the entire width of the second hinge bracket 360b and is substantially locked in its axial position. Moreover, a tactile or snap-fit sensation and/or an audible click may result when the annular protrusion 381 passes through the second pin-mounting protrusion 380b to indicate to the installer that the retaining pin 368 has been appropriately secured in its position within the pin-mounting protrusions 380a, 380b.

As noted above, the ends of the first and second extension springs 366a and 366b connect to spring pins 368 secured transversely within the base 364 of each of the hinge brackets 360a and 360b, respectively, to load tension into the biasing hinge assembly 346. In the depicted exemplary embodiment best shown in FIG. 18, the extension springs 366a and 366b each include a spring body or coil 385 that terminates at each end with a suitable hook, loop, etc., that is securable to the retaining pin 368. For instance, each extension spring 366a and 366b may include an eye insert 386 received within each open end of coil 385 that connects to the retaining pin 368. Specifically, as the retaining pin 368 is inserted into the pin-mounting protrusions 380a, 380b, and 380c, it also passes through the opening in the eye insert 386 to secure the end of each extension spring 366a and 366b to the retaining pin 368.

The coil 385 of each extension spring 366a and 366b extend overs a grooved, knuckle assembly 371 defined around the axis of the hinge pivot pin 354 such that it remains aligned with the longitudinal axes of the support arms 342d and 342f as they are moved from the collapsed to extended position. The grooved knuckle assembly 371 is defined by overlapping ends of hinge bracket fingers 370 extending from the base 364 of each hinge bracket 360a and 360b. More specifically, first and second hinge bracket fingers 370a and 370b extend from the base 364 of the first hinge bracket 360a and terminate in first and second rounded knuckle portions 372a and 372b, respectively, each having a transverse through-hole (not labeled) for receiving the hinge pivot pin 354. The second hinge bracket 360b has an identical configuration, with third and fourth hinge bracket fingers 370c and 370d extending from the base 364 and terminating in third and fourth rounded knuckle portions 372c and 372d, respectively, each having a transverse through-hole for receiving the hinge pivot pin 354.

As can be seen in FIGS. 18 and 19, the first and second hinge brackets 360a and 360b are arranged in a substantially 180 degree (180°) orientation relative to each other such that the hinge bracket fingers 370 extend toward each other. The ends of the hinge bracket fingers 370 overlap to arrange the knuckle portions 372 in an alternating, stacked pattern. Specifically, from left to right in FIG. 18, knuckle portion 372a is stacked adjacent to knuckle portion 372d, which is stacked adjacent to knuckle portion 372b, which is stacked adjacent to knuckle portion 372c. In this manner, the transverse through-holes of the knuckle portions 372 are aligned for receiving the hinge pivot pin 354.

The hinge pivot pin 354 extends transversely through the knuckle portions 372 for pivotally connecting the second and first ends of the second and fourth intermediate intersecting support arms 342d and 342f One or more bearings or bushings may be disposed within the knuckle portions 372 for defining a low-friction pivot assembly. In the depicted embodiment, first, second, third, and fourth flanged sleeve bushings 387a, 387b, 387c, and 387d are received within the corresponding through-holes of knuckle portions 372a, 372b, 372c, and 372d, with the flange portion of each bushing extending transversely between the stacked, adjacent knuckle portions. The sleeve bushings 387a, 387b, 387c, and 387d may be made from any suitable low-friction material, such as PTFE polyimide plastic, optionally with a hardener.

During assembly, the sleeve bushings 387a, 387b, 387c, and 387d are inserted into the corresponding knuckle portion 372a, 372b, 372c, and 372d, and the knuckle portions are overlapped in the above-described manner. An elongated body 389 of the hinge pivot pin 354 is pushed through the aligned bushing openings to pivotally connect the knuckle portions 372a-372d. In the depicted embodiment, the hinge pivot pin 354 is inserted through the sleeve bushings 387a, 387d, 387b, and 387c of corresponding knuckle portions 372a, 372d, 372b, and 372c, in that order, such that a head 391 of the pivot pin abuts an outer transverse surface of the knuckle portion 372a of the first hinge bracket 360a.

The distal end of the elongated body 389 protrudes through knuckle portion 372c, and a push cap 393 is secured thereon. The push cap 393 locks onto the distal end of the elongated body 389 in a manner well known in the art and abuts against an outer transverse surface of the knuckle portion 372c of the second hinge bracket 360b. As such, the elongated body 389 is axially retained within the aligned knuckle portions 372a, 372d, 372b, and 372c to secure the hinge pivot pin 354 within the knuckle assembly 371. With the knuckle portions 372 aligned and pivotally connected through the hinge pivot pin 354, the second and fourth intermediate intersecting support arms 342d and 342f may pivot about the axis of the hinge pivot pin between open and closed configurations.

Each knuckle portion 372 includes an exterior groove 373 (e.g., a first groove 373a, a second groove 373b, a third groove 373c, and a fourth groove 373d) extending around at least a portion of its circumference that is shaped and configured to receive and align the corresponding coil 385 along the exterior of the hinge assembly 346 as it is moved between open and closed configurations. As noted above, first and second extension springs 366a and 366b extend along the exterior surfaces of the overlapping first and second hinge brackets 360a and 360b. The coil 385 of the first extension spring 366a is received in a first groove 373a defined on the first knuckle portion 372a, and the coil 385 of the second extension spring 366b is received in a fourth groove 373d defined on the fourth knuckle portion 372d. In that regard, the hinge assembly 346 is configured to accommodate third and fourth extension springs if needed to increase the opening torque of the hinge assembly.

With the extension springs 366a and 366b received in the grooves 373a and 373d, the extension springs 366a and 366b can wrap or stretch over the knuckle portions 372a and 372d when the support arms 342d and 342f partially or fully collapse. As can be seen in FIG. 16, the springs 366a and 366b are pulled into maximum tension when the extendable frame 338 is fully collapsed with the support arms 342 resting substantially against each other. In this fully tensioned, stretched state, the extension springs 366a and 366b store mechanical energy or torque for moving the support arms 342 into the extended, deployed configuration.

In that regard, when the extendable frame 338 is released, such as by a suitable release mechanism, it pops out into the extended, deployed state. The extendable frame 338 may be selectively secured in the collapsed configuration in any suitable manner, such as by inserting a pin transversely into one or more support arms 342, wherein the pin can be removed to allow the extendable frame to spring upwardly into the deployed configuration. Moreover, once deployed or extended, the extendable frame 338 may be steered relative to the chassis 302 in a suitable manner, such as with a motor, into different configurations relative to the chassis (see FIGS. 11-13).

It can be appreciated that with the first and second extension springs 366a and 366b stretched over the knuckle portions 372, the extendable frame 338 may, instead of extending into the extended, deployed configuration, invert and further collapse or otherwise fail to move into the deployed position (e.g., get bound, stuck, etc.). In that regard, typical pantograph structures may be stowed in a partially extended position (i.e., not fully collapsed) to prevent the structure from moving in the wrong direction into an over-center failure mode. However, the low stow ratio of a partially extended pantograph structure is undesirable. In that regard, the solar array system 320 may further include at least one stop assembly configured to prevent at least a portion of the fully collapsed extendable frame 338 from moving into an inverted, further collapsed configuration. It should be appreciated that a "fully collapsed" extendable frame 338 may include support arms 342 that are substantially parallel to the plane of the chassis body 304.

However, the term "fully collapsed" should not be seen as limiting, as the extendable frame 338 may instead be stowed in any suitable launch configuration, such as a partially extended configuration.

The at least one stop assembly may be incorporated into a proximal terminating assembly 396 defined at the proximal end of the extendable frame 338. In general, the proximal terminating assembly 396 pivotally connects the proximal end of the extendable frame 338 to the chassis 302 such that the extendable frame 338 may be moved from the collapsed configuration into the extended configuration to deploy the solar array 314. Furthermore, the proximal terminating assembly 396 moveable couples the proximal end of the extendable frame 338 to the chassis 302 such that the deployed solar array 314 may be steered relative to the chassis 302.

To better understand how the at least one stop assembly prevents at least a portion of the fully collapsed extendable frame 338 from moving into an inverted, further collapsed configuration, aspects of the proximal terminating assembly 396 used to pivotally and moveable couple the extendable frame 338 to the chassis 302 will first be described in detail with reference to FIGS. 15, 20, and 21. As noted above, the extendable frame 338 includes first and second proximal half support arms 342a and 342b that are each pivotally coupled to the chassis body 304 at a proximal end. The proximal terminating assembly 396 is generally configured to allow the first and second proximal half support arms 342a and 342b to pivot relative to the chassis body 304 such that the extendable frame 338 may move between the collapsed and extended positions.

In that regard, the proximal terminating assembly 396 includes first and second terminating pivot pins 402 and 404 configured to pivotally secure the proximal ends of the first and second proximal half support arms 342a and 342b to the chassis 302. More particularly, the first and second terminating pivot pins 402 and 404 are pivotally secured within a terminating bracket 410, and the terminating bracket 410 is secured to the chassis 302, as shown in FIG. 15. The terminating bracket 410 may have any suitable structure, such as an open frame structure that maximizes strength while minimizing mass.

Figure 20:
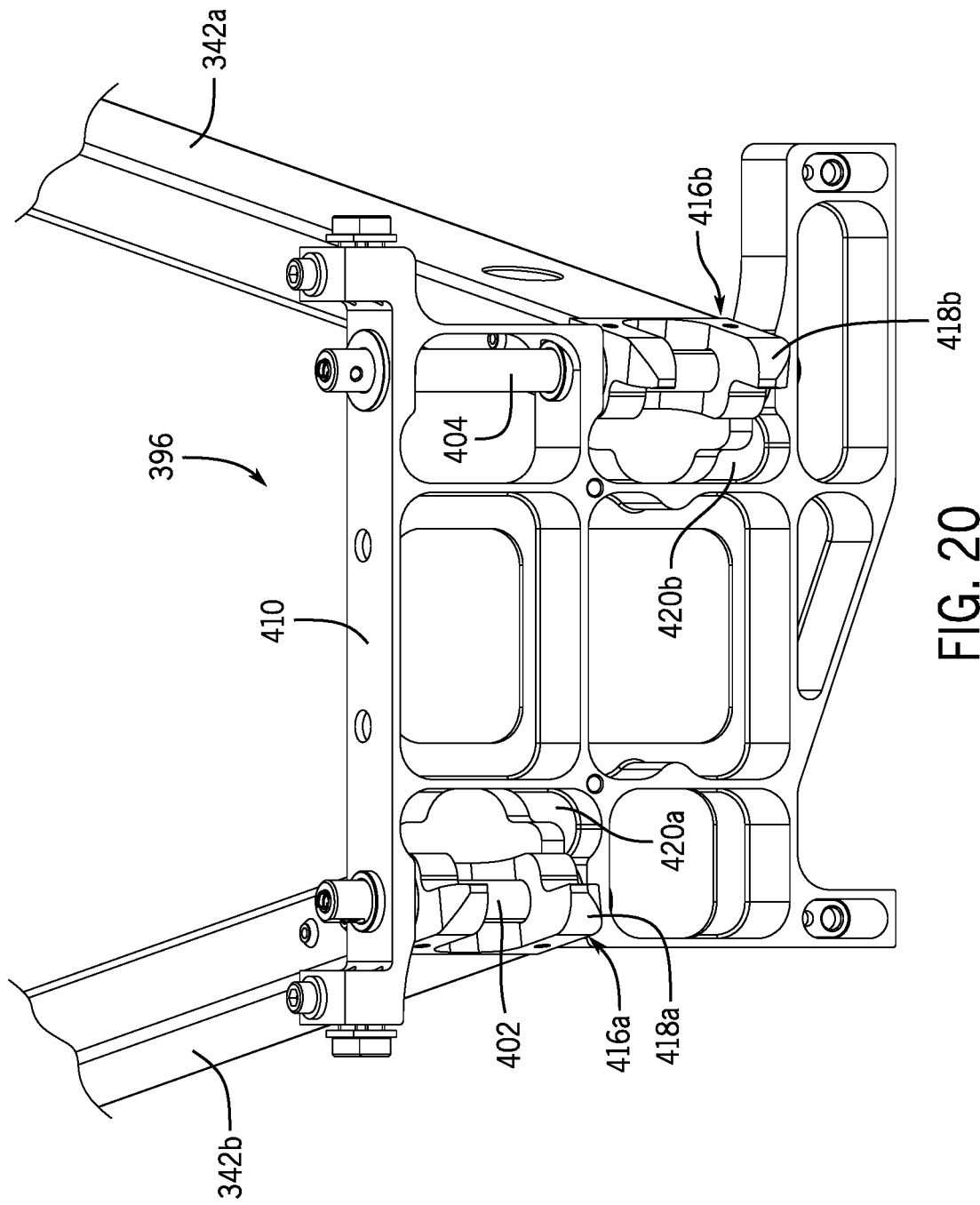
FIG. 20 depicts an isometric view of a proximal terminating assembly of the extendable frame of FIG. 14 in accordance with embodiments of the present disclosure, shown in a first configuration.
Figure 21:
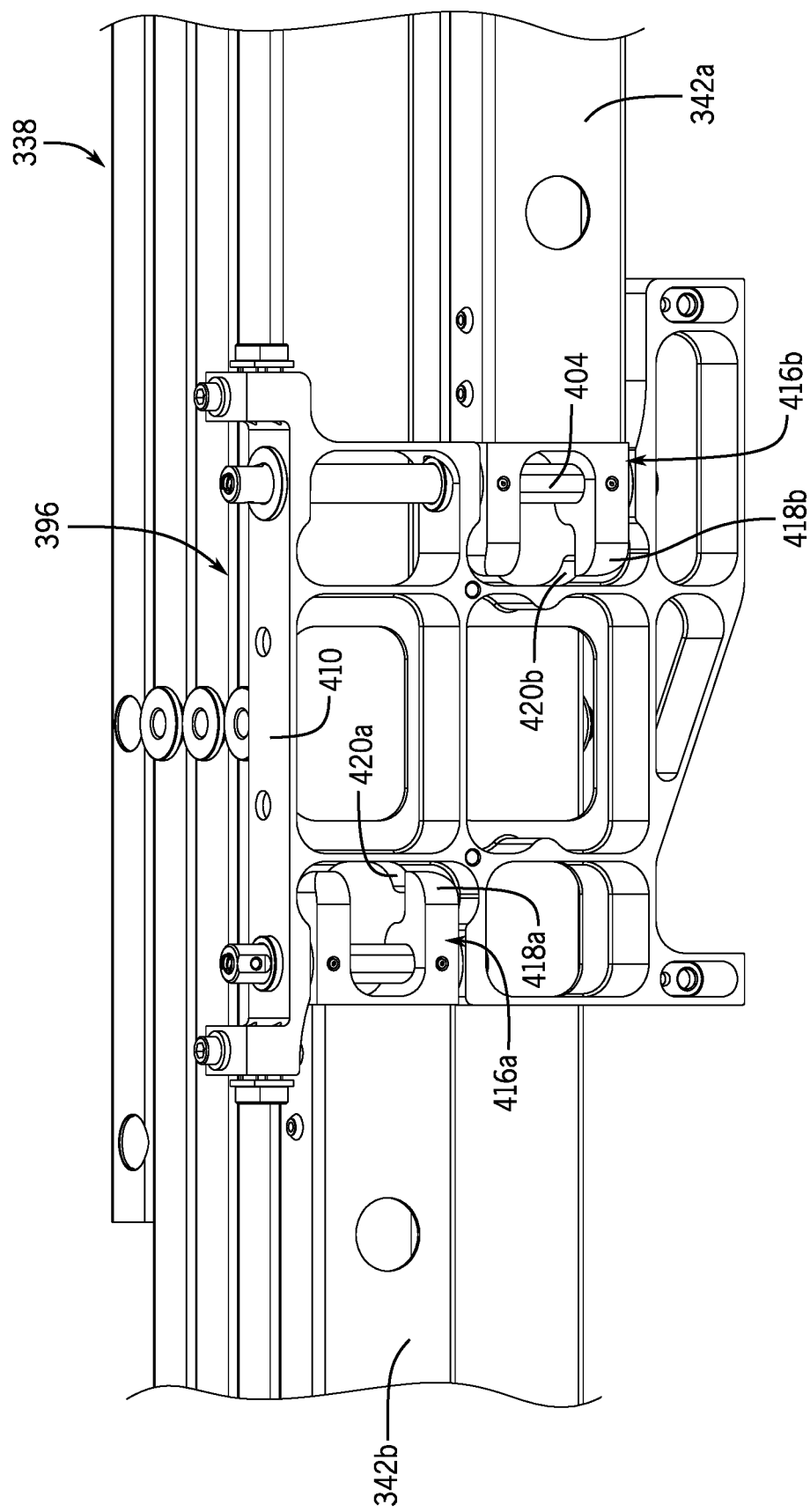
FIG. 21 depicts an isometric view of the proximal terminating assembly of FIG. 20, shown in a second configuration.

As can be seen in FIGS. 20 and 21, the first and second terminating pivot pins 402 and 404 have first and second pivot axes (not labeled) that are substantially parallel and lie in substantially the same plane of the terminating bracket 410. In this manner, the first and second proximal half support arms 342a and 342b may pivot about the axes of the first and second terminating pivot pins 402 and 404 to move the proximal half support arms 342a and 342b, and therefore the extendable frame 338, transversely from the terminating bracket 410 when deployed. In that regard, the extendable frame 338, proximally coupled to the terminating bracket 410 through the first and second terminating pivot pins 402 and 404, extends into the deployed configuration substantially transversely to the axes of the first and second terminating pivot pins 402 and 404. To that end, a deploy axis D of the extendable frame 338 is also substantially transverse to the plane of the terminating bracket 410.

The terminating pivot pins 402 and 404 may be offset from one another or may otherwise be extended in length as needed to accommodate the vertically offset relationship of the first and second proximal half support arms 342a and 342b. As noted above, the support arms 342 are offset in vertically adjacent planes such that they may be pivotally coupled together and may move vertically relative to one another between the collapsed and extended configurations.

In the depicted embodiment, the second terminating pivot pin 404 extends along substantially the entire length of the terminating bracket 410, whereas the first terminating pivot pin 402 extends along about half of the length of the terminating bracket 410. The first proximal half support arm 342a is secured to a first end of the first terminating pivot pin 402 extending along a first half of the terminating bracket 410, and the second proximal half support arm 342b is secured to a first end of the second terminating pivot pin 404 extending along a second half of the terminating bracket 410. In this manner, the first and second proximal half support arms 342a and 342b are pivotally secured to the bracket 406 but offset so as to move in adjacent vertical planes between the collapsed and extended positions.

As noted above, the proximal terminating assembly 396 also moveable couples the proximal end of the extendable frame 338 to the chassis 302 such that the deployed solar array 314 may be steered relative to the chassis 302. More specifically, the terminating bracket 410 is moveably secured to the chassis 302, and the extendable frame 338 moves with the terminating bracket 410 about a steering axis R. As can be understood by referring to FIGS. 11-13, the extendable frame 338 remains extended along the deploy axis D as the terminating bracket 410 is moved between various angular positions relative to the chassis 302 for optimally positioning the solar array 314. To that end, the blanket portion 332 may also be secured the terminating bracket 410 along its proximal edge such that the blanket portion 332, held in tension by the extendable frame 338, moves with the terminating bracket 410.

Figure 15:
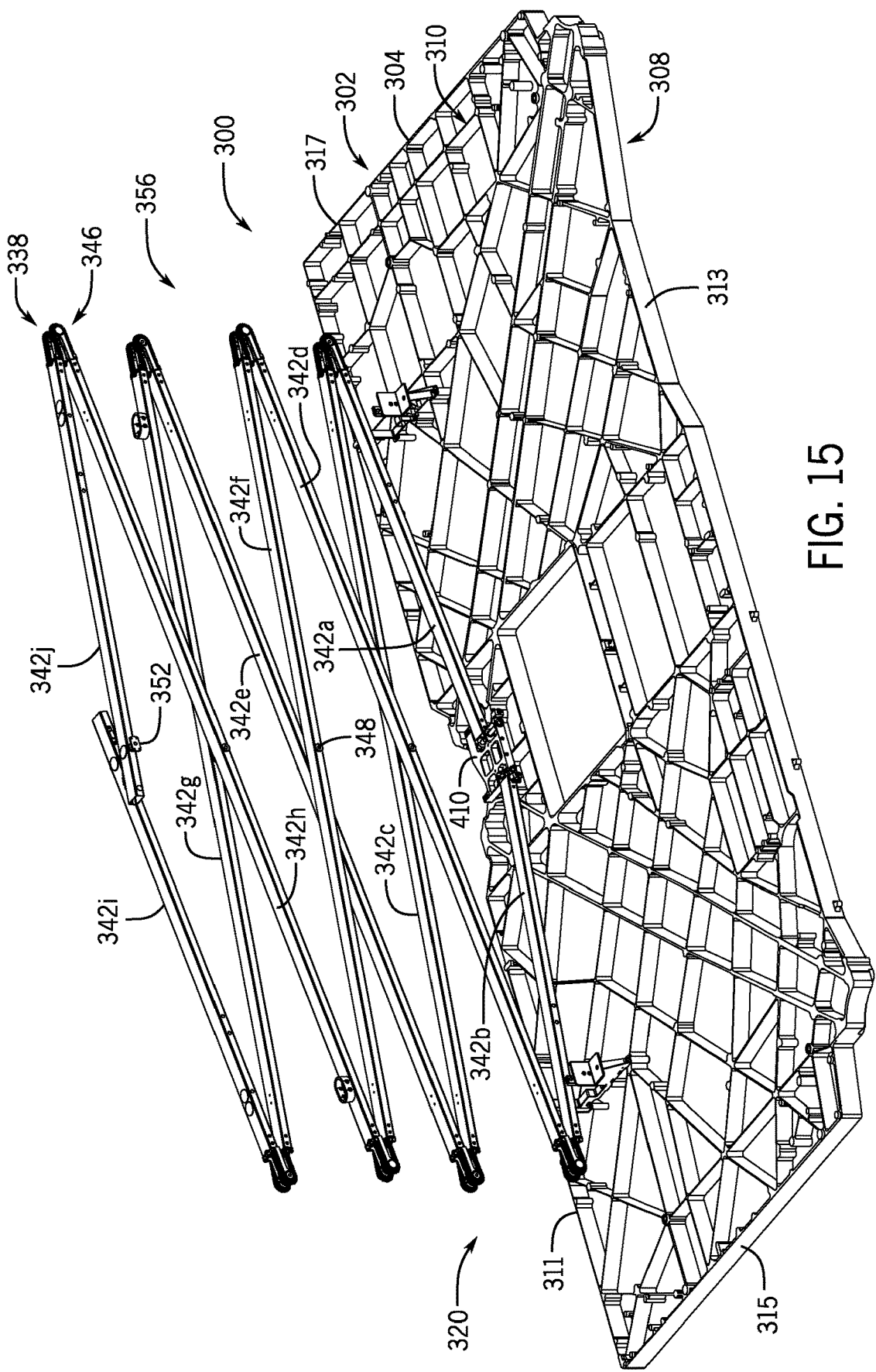
FIG. 15 depicts an isometric view of the spacecraft of FIG. 14 with the extendable frame shown in a partially deployed configuration in accordance with embodiments of the present disclosure.

Referring to FIG. 15, in the depicted embodiment, the terminating bracket 410 has a plane that is substantially parallel to the plane of the chassis body 304 when the terminating bracket 410 is in a first position. In this first position, the terminating bracket 410 supports the extendable frame 338 in a collapsed, stowed configuration (see FIG. 14). Moreover, in this first launch or stow position, the terminating bracket 410 positions the extendable frame 338, when initially released, to extend transversely from the chassis body 304 along the deploy axis D. In that regard, the deploy axis D is substantially transverse to the plane of the chassis body 304 when initially released into the deployed configuration.

The terminating bracket 410 may be movably secured to the chassis 302 in any suitable manner such that the deployed solar array 314 may be steered between different angular positions relative to the chassis 302. For instance, the terminating bracket 410 may be operably coupled to an output of a movement device, such as an actuator, to move the terminating bracket 410 about the steering axis R between different angular positions relative to the chassis 302. In the depicted exemplary embodiment, the steering axis R is substantially transverse to the deploy axis D, as shown in FIGS. 11-13.

The terminating bracket 410, together with the deployed solar array 314 are moved about the steering axis R between at least a first angular position relative to the chassis 302, wherein the deployed solar array 314 (and therefore the deploy axis D) is substantially transverse to the chassis body 304 (FIG. 11), a third angular position relative to the chassis 302, wherein the deployed solar array (and therefore the deploy axis D) is substantially co-planar with the chassis body 304 (FIG. 13), and a second angular position relative to the chassis 302 somewhere between the first and third angular positions (FIG. 12). In that regard, the spacecraft may be configured between at least first, second, and third spacecraft configurations, as shown in FIGS. 11, 12, and 13.

Moreover, when moved into the various different spacecraft configurations, the deploy axis D of the solar array 314 remains substantially perpendicular to the steering axis R.

Referring back to FIGS. 20 and 21, the at least one stop assembly for preventing at least a portion of the fully collapsed extendable frame 338 from moving further into an inverted, collapsed configuration will now be described. In the depicted exemplary embodiment, the proximal terminating assembly 396 includes a proximal stop assembly 412 configured to help prevent the proximal end of the extendable frame 338 from inverting further down past the fully collapsed position. The proximal stop assembly 412 includes first and second travel limiters 416*a* and 416*b* defined at the proximal end of the first and second proximal half support arms 342*a* and 342*b*, respectively, which are configured to engage a portion of the terminating bracket 410 when the first and second proximal half support arms 342*a* and 342*b* move past a fully collapsed configuration toward an inverted position.

The travel limiters 416*a* and 416*b* may be defined by travel limiter brackets 418*a* and 418*b* secured to or otherwise extending from the proximal end of the first and second proximal half support arms 342*a* and 342*b*, respectively. Each travel limiter bracket 418*a* and 418*b* includes at least one stop portion 420*a* and 420*b*, respectively that is configured to engage a portion of the terminating bracket 410 when the first and second proximal half support arms 342*a* and 342*b* move past a fully collapsed configuration toward an inverted position.

In the depicted embodiment, the travel limiter brackets 418*a* and 418*b* are pivotally secured to the first and second terminating pivot pins 402 and 404, respectively, such that the corresponding stop portion 420*a* and 420*b* extends transversely from the terminating pin axis. As such, the stop portions 420*a* and 420*b* move about the axes of the pivot pins 402 and 404 when the first and second proximal half support arms 342*a* and 342*b* move. The stop portions 420*a* and 420*b* engage a corresponding interference bracket portion 422*a* and 422*b* of the terminating bracket 410 when the first and second proximal half support arms 342*a* and 342*b* move past the fully collapsed position.

The interference bracket portions 422*a* and 422*b* defined on the terminating bracket 410 prevent the stop portions 420*a* and 420*b*, and therefore the support arms 342*a* and 342*b*, from moving past the fully collapsed position. As such, the proximal stop assembly 412 reacts the biasing force of the extendable frame deploy system 356 to prevent the extendable frame 338 from inverting or otherwise failing to move into the deployed position (e.g., get bound, stuck, etc.). It should be appreciated that any other suitable configuration may additionally or alternatively be used to help prevent the proximal end of the extendable frame 338 from moving past a fully collapsed configuration.

With the above-described structural details in mind, the overall operation of the solar array system 320 will now be described with reference to FIGS. 11-21.

Referring to FIG. 14, the solar array 314 is stowed against the chassis 302 for launch of the rocket and passive dispensing of the spacecraft from the stack upon reaching orbit. In that regard, the extendable frame 338 is shown collapsed against the chassis 302 with the plane of the terminating bracket 410 substantially parallel to the plane of the chassis body 304. The collapsed extendable frame 338 is secured in the collapsed configuration through a suitable release assembly (such as a pin, described above). As such, the extendable frame 338 is prevented from moving upwardly away from the chassis body 304 into an extended configuration against the biasing force of the hinge assemblies 346.

With the extendable frame 338 secured in the fully collapsed configuration, the springs 366*a* and 366*b* wrap around the hinge assemblies 346 and are pulled into maximum tension. In this fully tensioned, stretched state, the extension springs 366*a* and 366*b* store mechanical energy or torque for moving the support arms 342 into the extended, deployed configuration. Moreover, the extendable frame 338 is prevented from inverting by the interface of the travel limiters 416*a* and 416*b* with the terminating bracket 410.

After the spacecraft are released from the rocket, the solar array 314 may be released into a deployed configuration. Deployment of the solar array 314 may be initiated after, for instance, the stack of released spacecraft have sufficiently separated to avoid any unwanted collision.

The solar array 314 is deployed by triggering release of the extendable frame 338, such as by withdrawing a pin out of engagement with the extendable frame 338. When released, the extendable frame 338, biased by the biasing hinge assemblies 346, springs open into the extended configuration to deploy the blanket portion 332. The extendable frame 338 deploys substantially transversely to the chassis body 304 (and therefore substantially transversely to the terminating bracket 410) into the first configuration shown in FIG. 11. When deployed, the extendable frame 338 pulls the blanket portion 332 upwardly into a deployed configuration and secures the blanket portion 332 in tension.

Once the solar array 314 is fully deployed, the solar array 314 may be moved about the steering axis R into the various other configurations shown in FIGS. 12 and 13, as well as back into the configuration shown in FIG. 12. The solar array 314 may be moved about the steering axis R into the various configurations shown in FIGS. 11-13, for instance, to optimize the spacecraft for movement into orbit, for optimizing solar harnessing from the sun, etc.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A system for deploying a solar array blanket portion relative to a spacecraft and supporting the solar array blanket portion in a deployed position, the system comprising:

an extendable frame moveable between a collapsed configuration and an extended configuration, comprising:
a first support arm having first and second opposing distal ends;
a second support arm having first and second opposing distal ends;
a third support arm having first and second opposing distal ends;
a fourth support arm having first and second opposing distal ends;
a first pivot pin assembly defined at an intersection of the first and third support arms and a second pivot pin assembly defined at an intersection of the second and fourth support arms;
a first hinge assembly defined between the second distal end of the first support arm and the first distal end of the second support arm;
a second hinge assembly defined between the second distal end of the third support arm and the first distal end of the fourth support arm; and
a first biasing member having a first end coupled to the first support arm and a second end coupled to the second support arm, the first biasing member extending between the second and first distal ends of the first and second support arms along an exterior portion of the first hinge assembly.

2. The system of claim 1, further comprising a second biasing member having a first end coupled to the third support arm and a second end coupled to the fourth support arm, the second biasing member extending between the second and first distal ends of the third and fourth support arms along an exterior portion of the second hinge assembly.

3. The system of claim 1, wherein the first biasing member is an extension spring extending between the second and first distal ends of the first and second support arms that wraps around an exterior portion of the first hinge assembly.

4. The system of claim 1, further comprising a first hinge bracket secured within the second distal end of the first support arm and a second hinge bracket secured within the first distal end of the second support arm, wherein the first biasing member extends between a first retaining pin secured within the first hinge bracket and a second retaining pin secured within the second hinge bracket.

5. The system of claim 4, wherein the first retaining pin is secured within at least first and second pin-mounting protrusions extending from a portion of the first hinge bracket, and wherein an annular protrusion defined on a body of the first retaining pin is configured to retain the first retaining pin within the first and second pin-mounting protrusions after passing through the first and second pin-mounting protrusions.

6. The system of claim 4, further comprising a grooved knuckle assembly defined between the first and second hinge brackets configured to receive the first biasing member as it extends between the first and second hinge brackets.

7. The system of claim 1, wherein in the collapsed configuration, the first, second, third, and fourth support arms are substantially parallel.

8. The system of claim 7, further comprising a stop assembly having a bracket configured to substantially prevent at least one of the first, second, third, and fourth support arms from moving into an inverted configuration.

9. A solar array system for a spacecraft, comprising:
a solar array blanket portion moveable from a stowed configuration into a deployed configuration;
an extendable frame coupled to the spacecraft and the blanket portion and moveable from at least a collapsed configuration into an extended configuration to move the solar array blanket portion from the stowed configuration into the deployed configuration, wherein the extendable frame includes at least first and second support arms; and
at least one biasing member extending across an exterior portion of a first hinge assembly that is configured to bias at least a portion of the extendable frame into the deployed configuration, wherein the first hinge assembly pivotally connects a second distal end of the first support arm to a first distal end of the second support arm, and wherein the at least one biasing member is a spring extending between the second and first distal ends of the first and second support arms that wraps around an exterior portion of the first hinge assembly.

10. The solar array system of claim 9, wherein the at least one biasing member is configured to urge the first and second support arms away from each other.

11. The solar array system of claim 9, wherein in the collapsed configuration, the first support arm and the second support arm are substantially parallel.

12. The solar array system of claim 9, wherein the first biasing member extends between a first retaining pin secured within a first hinge bracket and a second retaining pin secured within a second hinge bracket.

13. A spacecraft assembly, comprising:
a chassis;
a solar array blanket portion moveable relative to the chassis from a stowed configuration into a deployed configuration;
an extendable frame coupled to the chassis and the blanket portion and moveable from at least a collapsed configuration into an extended configuration to move the solar array blanket portion from the stowed configuration into the deployed configuration, wherein the extendable frame includes at least first and second support arms;
at least one biasing member having a first end coupled to the first support arm and a second end coupled to the second support arm, the first biasing member extending across an exterior portion of a first hinge assembly that is configured to bias at least a portion of the extendable frame into the deployed configuration; and
a stop assembly having a bracket configured to substantially prevent the first and second support arms from moving into an inverted configuration past a substantially horizontal configuration relative to the spacecraft.

14. The spacecraft of claim 13, wherein the extendable frame is moveable into the extended configuration along a deploy axis that is substantially transverse to the chassis of the spacecraft.

15. The spacecraft of claim 14, wherein the extendable frame is movably coupled to the spacecraft about a steering axis that is substantially transverse to the deploy axis.

\* \* \* \* \*